US012748000B2

(12) United States Patent
Cao et al.

(10) Patent No.: US 12,748,000 B2
(45) Date of Patent: Sep. 29, 2026

(54) SENSOR FOR MULTIFUNCTIONAL SENSING

(71) Applicant: CASE WESTERN RESERVE UNIVERSITY, Cleveland, OH (US)

(72) Inventors: Changyong Cao, Okemos, MI (US); Yaokun Pang, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 282 days.

(21) Appl. No.: 18/601,468

(22) Filed: Mar. 11, 2024

(65) Prior Publication Data

US 2024/0302228 A1 Sep. 12, 2024

Related U.S. Application Data

(60) Provisional application No. 63/489,259, filed on Mar. 9, 2023.

(51) Int. Cl.

| | |
|---|---|
| ***G01L 1/22*** | (2006.01) |
| ***A61B 5/00*** | (2006.01) |
| ***G01L 1/00*** | (2006.01) |
| ***G01L 1/18*** | (2006.01) |

(52) U.S. Cl.
CPC ............ *G01L 1/2287* (2013.01); *G01L 1/183* (2013.01)

(58) Field of Classification Search
CPC . G01L 1/18; G01L 5/0028; G01L 1/20; G01L 5/009; G01L 1/142; G01L 1/14; G01L 1/005; G06F 3/0321; G06F 3/0445; G06F 3/016; G06F 3/013; G06F 3/014; D04B 15/66; A61B 5/05; A61B 5/11; A61B 5/1121; A61B 5/0536; A61B 5/086; A61B 5/02055; G16H 50/30; G01H 1/00; A61M 21/00; G01D 5/2417; A41D 13/1281; A41D 1/005; G06N 20/00; A61N 1/0452; G01N 27/06; G16C 60/00; H02N 1/002; G05B 15/02; G01B 7/16
See application file for complete search history.

(56) References Cited

U.S. PATENT DOCUMENTS

2022/0326099 A1* 10/2022 Chong ..................... G01L 1/18

FOREIGN PATENT DOCUMENTS

CN 115901034 A * 4/2023
WO WO-2022236169 A1 * 11/2022 ............. G06F 3/014

* cited by examiner

*Primary Examiner* — Brandi N Hopkins
(74) *Attorney, Agent, or Firm* — Tarolli, Sundheim, Covell & Tummino LLP

(57) ABSTRACT

A textile-based sensor includes a textile triboelectric nanogenerator sensor attached to and overlying a textile piezoresistive sensor, wherein the textile triboelectric nanogenerator sensor is configured to generate an electrical signal indicative of object contact force and/or frequency with the textile triboelectric nanogenerator sensor, object material, and object surface morphology or texture, and the textile piezoresistive sensor is configured to generate an electric signal indicative of the applied external pressure to the sensor, wherein the textile triboelectric nanogenerator sensor overlies the textile piezoresistive sensing.

20 Claims, 27 Drawing Sheets

B

F

G

H

I

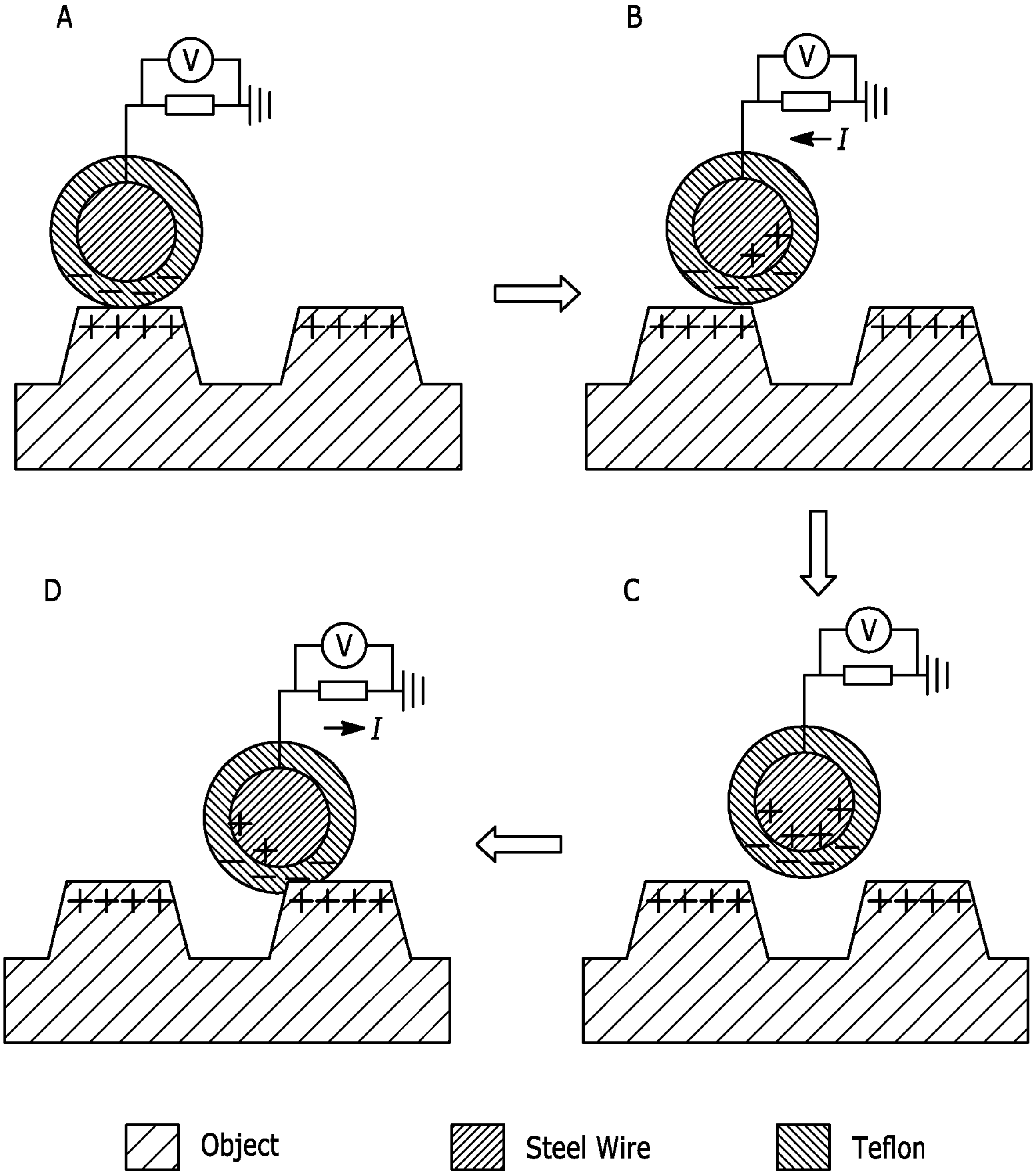
Fig. 14A-D

SENSOR FOR MULTIFUNCTIONAL SENSING

CROSS-REFERENCE TO RELATED APPLICATIONS

This application claims priority from U.S. Provisional Application No. 63/489,259, filed Mar. 9, 2023, the subject matter of which is incorporated herein by reference in its entirety.

GOVERNMENT FUNDING

This invention was made with government support under 2024649 awarded by the National Science Foundation. The government has certain rights in the invention.

BACKGROUND OF THE INVENTION

Multifunctional tactile perception is of paramount importance to achieve environment awareness and human-machine interactions in sophisticated applications of smart wearables and intelligent robots. Over the past decade, inspired by human skin, various tactile sensors and artificial electronic skins (E-skins) have been proposed for precise and rapid sensing use based on different technologies, including piezoresistive, capacitive, electret, magnetic, triboelectric, etc. Furthermore, multiple sensors are integrated into a sensing network or array to enable multisensory functionality of the devices. Although significant progress has been made in the development of tactile sensors and E-skins, some critical issues still need to be addressed urgently. For example, most existing tactile sensors are designed based on a single sensing mechanism that cannot percept sufficient information and respond to complex stimuli. The integration of multiple sensors remains very challenging, usually requiring the design of complicated structures and fabrication processes and may suffer from mutual interference in multiple stimuli perceptions. In addition, polymer substrates such as polydimethylsiloxane (PDMS), polyethylene terephthalate (PET), and polyimide, are widely utilized for tactile sensors, resulting in poor air permeability and discomfort feeling for wearables. Compared with polymers, textile is mechanically robust, soft, breathable, and comfortable to human skin, and an ideal material for wearable electronics. However, due to the challenges in surface and interface integration, textile-based tactile sensors that can mimic the functions of mechanoreceptors are still lacking. Therefore, it is essential to develop new tactile sensors with excellent sensing performance and a simple fabrication process.

SUMMARY

Embodiments described herein relate to textile-based tactile sensors that can mimic the sensory capabilities of human skin to perceive various external static and dynamic stimuli and provide, for example, multifunctional sensing for personalized healthcare monitoring, robotic control, and wearable electronics. The textile-based tactile sensors can include a triboelectric nanogenerator sensing layer configured to mimic the function of fast-adapting (FA) mechanoreceptors and a piezoresistive sensing layer configured to achieve functionality of slow-adapting (SA) mechanoreceptors. The textile-based tactile sensors described herein were found to be able to recognize voice and monitor physiological signals and human motions in a real time manner. Moreover combined with a machine learning framework in a system, the tactile sensors are able to percept surface textures and material types with high accuracy as well as provide an effective human-machine interface for the control of assistive robotics.

In some embodiments, the textile-based tactile sensor can include a textile electrode layer, a piezoresistive sensing layer, a triboelectric layer, and optionally an additional textile layer.

In some embodiments, the piezoresistive sensing layer can overlie the textile electrode layer, the additional textile layer can overlie the piezoresistive sensing layer, and the triboelectric layer can overlie the additional textile layer.

In some embodiments, the piezoresistive sensing layer and the overlying textile layer are porous, and each has a surface roughness that defines a contact area that changes as applied external pressure to the sensor changes, generating an electric signal indicative of the applied external pressure.

In some embodiments, the electric signal is a change in current under an applied voltage and the change in current is indicative of the applied external pressure.

In some embodiments, the textile electrode layer includes a metal-coated textile. For example, the metal-coated textile can include at least two interdigitated metal electrodes deposited or coated on a fabric substrate. Metal electrodes can include, for example, copper, gold, palladium, platinum, silver, or other metals that are deposited or coated on the fabric substrate.

In some embodiments, the piezoresistive sensing layer includes a carbon nanotube (CNT) coated fabric. The CNT coated fabric can be formed by dipping a textile fabric, such as a cotton textile fabric, into a CNT solution and then dried to evaporate the solvent.

In some embodiments, the triboelectric layer includes a triboelectric electrode yarn arranged on a fabric in a pattern, such as a fingerprint-like pattern. The triboelectric electrode yarn includes an inner conductive core and an outer dielectric shell. The inner conductive core can include a metal, such as steel, and the outer dielectric shell can include a dielectric polymer shell, such as Teflon.

In some embodiments, a single triboelectric electrode yarn can be stitched in the fabric of the triboelectric layer in the pattern to provide a single-electrode triboelectric nanogenerator (TENG).

In some embodiments, the triboelectric layer is configured to generate an electrical signal upon contact of the triboelectric electrode yarn with an object.

In some embodiments, object contact with the surface of the outer dielectric shell of the triboelectric electrode yarn results in a gain of negative triboelectric charges by the dielectric shell, and separation of the object from the surface of the outer dielectric shell of the triboelectric electrode yarn results in electron flow from the electrode layer generating an output voltage that is dependent on and indicative of the object contact force and/or frequency with the triboelectric layer, object material, and object surface morphology or texture.

Other embodiments described herein relate to a system comprising textile-based tactile sensor described herein.

In some embodiments, the textile-based tactile sensor can include a triboelectric nanogenerator sensor configured to generate an electrical signal indicative of object contact force and/or frequency with the triboelectric sensor, object material, and object surface morphology or texture, and a piezoresistive sensor configured generate an electric signal indicative of the applied external pressure to the sensor.

The system can further include a processor and a non-transitory computer readable medium storing machine-readable instructions executable by a processor. The processor is configured to execute the instruction including a machine learning model that is configured to generate an output indicative of texture perception and/or material recognition based on the electric signals generated by the triboelectric nanogenerator sensing layer and the piezoresistive sensing layer.

In some embodiments, the machine learning model includes an artificial neural network (ANN) that comprises an input layer, output layer and at least one hidden layer configured for function approximation and nonlinear regression.

In some embodiments, all the neurons between every layer are fully connected by each other and the input time-domain signals of each material have i=400 neurons, where $n \in [1, 2, \ldots, N]$ and N is the types of materials that have been used to train the network and output layer are their list number of materials types from 1 to N.

In some embodiments, the input time-domain data of N types of materials are reorganized to N types of a matrix, each input vector and output layer has 400 neurons and 1 neuron, respectively.

In some embodiments, the training input signal for n-th type of material is expressed as Mn=(Mn,1, Mn,2, . . . , Mn,720) (n=1, 2, . . . , N), the total input training signal is expressed as Xdatabase=(M1, M2, . . . , MN), the training function is ƒ(Xinput)=Youtput, the output of a neuron (e.g., neuron j) in a hidden layer or the output layer, output j, is a weighted sum of the outputs of all the neurons in the preceding layer, processed by an activation function yj=ƒ(Σwij i xi+bj) where yj is the output of the neuron j, wij is the weight for the connection between a neuron I in the preceding layer and the neuron j, bj is the bias for neuron j, and ƒ is the activation function for calculating the output of neuron j based on the sum of the weighted inputs to the neuron and its bias.

BRIEF DESCRIPTION OF DRAWINGS

FIGS. 14(A-D) illustrate working principle of the TENG sensor for texture perception. (A) In the original position, the surfaces of the Teflon fiber and the object fully overlap and intimately contact each other. Electrons are injected from the object to the Teflon layer. (B) Once the Teflon with the negatively charged surface starts to slide outward, the electrons flow from steel electrode to ground, generating a current signal. (C) When the Teflon fully slides out of the object, the negative triboelectric charges are completely balanced out by induced positive charges, indicating no more current flow. (D) When the Teflon slides and contacts with another object, the induced electrons flow back to the steel electrode, generating a reverse current signal.

DETAILED DESCRIPTION

Figure 1:
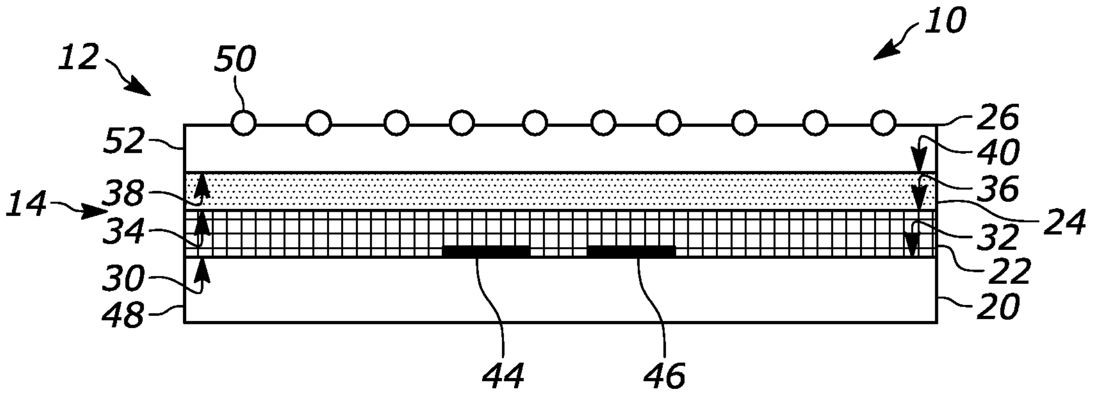
FIG. 1 is a schematic cross-sectional view of a textile-based tactile sensor in accordance with an embodiment.

To facilitate the understanding of this invention, a number of terms are defined below. Terms defined herein have meanings as commonly understood by a person of ordinary skill in the areas relevant to the present invention. Terms such as "a", "an", and "the" are not intended to refer to only a singular entity but also plural entities and also includes the general class of which a specific example may be used for illustration. The terminology herein is used to describe specific aspects of the invention, but their usage does not delimit the invention, except as outlined in the claims.

Throughout the description, where compositions are described as having, including, or comprising, specific components, it is contemplated that compositions also consist essentially of, or consist of, the recited components. Similarly, where methods or processes are described as having, including, or comprising specific process steps, the processes also consist essentially of, or consist of, the recited processing steps. Further, it should be understood that the order of steps or order for performing certain actions is immaterial so long as the compositions and methods described herein remains operable. Moreover, two or more steps or actions can be conducted simultaneously.

As used herein, the term "about" or "approximately" refers to a quantity, level, value, number, frequency, percentage, dimension, size, amount, weight or length that varies by as much as 15%, 10%, 9%, 8%, 7%, 6%, 5%, 4%, 3%, 2% or 1% to a reference quantity, level, value, number, frequency, percentage, dimension, size, amount, weight or length. In one embodiment, the term "about" or "approximately" refers a range of quantity, level, value, number, frequency, percentage, dimension, size, amount, weight or length±15%, ±10%, ±9%, ±8%, ±7%, ±6%, ±5%, ±4%, ±3%, ±2%, or ±1% about a reference quantity, level, value, number, frequency, percentage, dimension, size, amount, weight or length.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation. "Optional" or "optionally" means that the subsequently described circumstance may or may not occur, so that the description includes instances where the circumstance occurs and instances where it does not.

Embodiments described herein relate to textile-based tactile sensors that can mimic the sensory capabilities of human skin to perceive various external static and dynamic stimuli and provide, for example, multifunctional sensing for personalized healthcare monitoring, robotic control, and wearable electronics. The textile-based tactile sensors can include a triboelectric nanogenerator sensing layer configured to mimic the function of fast-adapting (FA) mechanoreceptors and a piezoresistive sensing layer configured to achieve functionality of slow-adapting (SA) mechanoreceptors. The textile-based tactile sensors described herein were found to be able to recognize voice and monitor physiological signals and human motions in a real time manner. Moreover, combined with a machine learning framework in a system, the tactile sensors are able to percept surface textures and material types with high accuracy as well as provide an effective human-machine interface for the control of assistive robotics.

FIG. 1 is a schematic cross-sectional view of a textile-based tactile sensor 10 in accordance with an embodiment described herein. The textile-based tactile sensor 10 can include a triboelectric nanogenerator sensor 12 configured to generate an electrical signal indicative of object contact force and/or frequency with the triboelectric sensor 12, object material, and object surface morphology or texture, and a piezoresistive sensor 14 configured to generate an electric signal indicative of the applied external pressure to the sensor 10.

The sensor 10 includes a textile electrode layer 20, a textile piezoresistive sensing layer 22, a textile adhesion layer 24, and a textile triboelectric layer 26 that are formed from textile substrates. A bottom surface 30 of the textile piezoresistive sensing layer 22 overlies and contacts a top surface 32 of the textile electrode layer 20. A bottom surface 34 of the textile adhesion layer 24 contacts and overlies a top surface 36 of the textile piezoresistive sensing layer 22. A bottom surface 38 of the triboelectric layer 26 contacts and overlies a top surface 40 of the textile layer 24. The textile electrode layer 20, the textile piezoresistive sensing layer 22, the textile adhesion layer 24, and the textile triboelectric layer 26 can be attached, bonded, or adhered respectively to adjoining layers 20, 22, 24, and 26 by adhesives and/or stitching, sewing, or bonding the layers 20, 22, 24, and 26 together.

The textile electrode layer 20 includes a metal-coated textile. The metal coated textile includes at least two interdigitated metal electrodes 44 and 46 deposited or coated on a textile fabric substrate 48. The textile fabric substrate 48 can include a woven or non-woven textile that is formed from natural fibers or synthetic polymer fibers. A natural fiber is a fiber that is derived from living matter. Natural fibers can include, for example, cotton, silk, linen, and/or other appropriate organic fibers.

In some embodiments, the textile fabric can be formed using a spinning machine that spins the natural fibers into yarn. A knitting machine knits the yarn into knit fabric. In other examples, a weaving machine weaves the yarn into woven fabric. In some examples, the fabric can be formed from fusing, embroidery, sewing, weaving, or knitting by hand or machines. The type of fabric and how the fabric is knitted or woven can depend on the type of textile sensor being produced. For example, yarn can be routed to the appropriate knitting machine or weaving machine based on the type of textile sensor being produced. The yarn can be knitted or weaved into individual sized sheets for individual sensors or into larger sheets that can be trimmed to individual sized sheets for the individual sensors. By way example, the textile can include a woven cotton textile fabric having a porous structure.

The interdigitated metal electrodes 44 and 46 can include, for example, copper, gold, palladium, platinum, silver, or other metals that are deposited or coated on the fabric substrate 48. The metal electrodes 44 and 46 can be deposited or coated on the fabric substrate by, for example, thick film screen printing, ink jet printing, or laser etching processes. This fabrication process can also use a combination of these and any other fabrication techniques. By way of example, an interdigital electrode pattern can be designed by AutoCAD and then written onto the surface of a masking tape without damaging a textile substrate by using a computer-controlled commercial laser cutter system. Copper ink can then be coated on a surface of a cotton textile with the mask by a brush coating method and drying the CNT coated fabric, for example, in a vacuum oven.

The textile piezoresistive sensing layer 22 in contact with and overlying the textile electrode layer includes a carbon nanotube (CNT) coated fabric. The fabric coated with CNT can include a woven or non-woven textile that is formed from natural fiber or synthetic polymer fibers. By way example, the textile can include a woven cotton textile fabric having a porous structure. The CNT coated fabric can be formed by dipping a textile fabric, such as a cotton textile fabric, into a CNT solution and then dried to evaporate the solvent.

The textile piezoresistive sensing layer 22 and the underlying textile electrode layer 20 can be porous, and each can have a surface roughness that defines a contact area that changes as applied external pressure to the sensor changes and varies. The contact area between the textile piezoresistive sensing layer 22 and the bottom electrodes 44 and 46 of textile electrode 20 changes as applied external pressure varies. When external pressure is applied onto an outer surface of the textile-based tactile sensor, the porous structures of the textile piezoresistive 22 sensing layer and the textile electrode layer 20 deform, leading to the approaching and/or contact between the textile piezoresistive sensing layer 22 and the interdigital electrodes 44 and 46. This deformation generates a larger contact area and more conductive pathways between CNTs and electrode 44 and 46, leading to a significant increase of the current under an applied voltage. Once unloading, the CNT coated textile piezoresistive sensing layer 22 and the bottom electrode textile layer 20 restore to their original states, resulting in the reduction of conductive pathways and thereby the decrease of the current. Thus, the electric signal is a change in current under an applied voltage and the change in current indicative of the applied external pressure.

The adhesive textile layer 24 contacting and overlying the textile piezoresistive sensing layer 22 can include a biocompatible medical textile tape. The adhesive textile layer 24 is used to encapsulate the electrodes and ensure conformal contact between the textile piezoresistive sensing layer 22 and the electrodes of textile layer 20 and prevent mutual interference between the textile triboelectric layer and the piezoelectric sensing layer.

Figure 2:
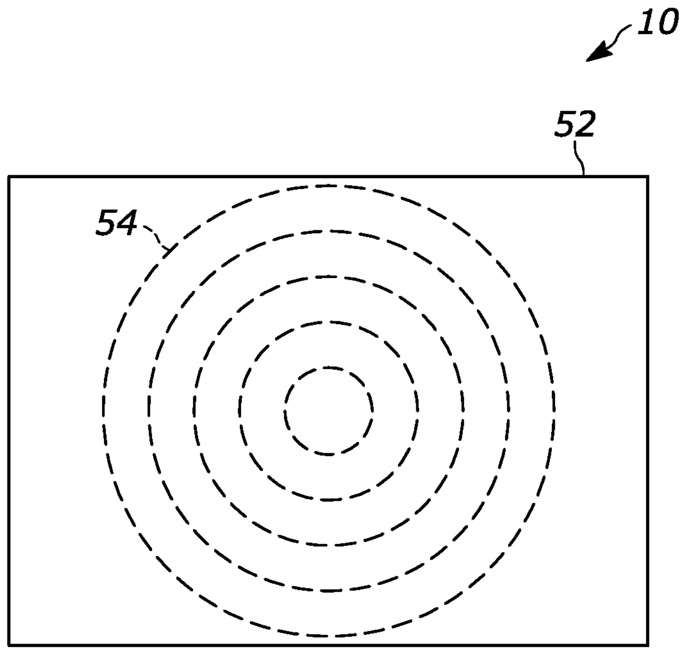
FIG. 2 is a top plan view of the triboelectric layer and triboelectric electrode yarn pattern in the layer.

The triboelectric layer 26 in contact with and overlying the adhesive textile layer 24 includes a single triboelectric electrode yarn 50 arranged on a surface of a textile fabric 52. As illustrated in FIG. 2, the triboelectric electrode yarn is arranged in a pattern 54, such as a fingerprint-like pattern or other geometric patterns, on the surface of the triboelectric layer fabric so as to provide ridges defined by the yarn that extend along the surface in loops, arches, whorls, or other geometric patterns. Similar to the fabric of the textile piezoresistive sensing layer 22 and the textile electrode layer 20, the textile fabric of the triboelectric layer 26 can include a woven or non-woven textile that is formed from natural fiber or synthetic polymer fibers, such as a cotton textile fabric.

The triboelectric electrode yarn 50 includes an inner conductive core and an outer dielectric shell. The inner conductive core can include a metal, such as steel, and the outer dielectric shell can include a dielectric polymer shell, such as Teflon.

In some embodiments, a single triboelectric electrode yarn 50 can be stitched in the textile fabric of the triboelectric layer in the pattern to provide a single-electrode triboelectric nanogenerator (TENG).

The triboelectric layer 26 is configured to generate an electrical signal upon contact of the triboelectric electrode yarn 50 with an object. In some embodiments, object contact with the surface of the outer dielectric shell of the triboelectric electrode yarn results in a gain of negative triboelectric charges by the dielectric shell, and separation of the object from the surface of the outer dielectric shell of the triboelectric electrode yarn results in electron flow from the electrode layer 20 generating an output voltage that is dependent on and indicative of the object contact force and/or frequency with the triboelectric layer 26, object material, and object surface morphology or texture.

By way of example, when an active object contacts the outer surface of the Teflon shell of the triboelectric electrode yarn, negative triboelectric charges are gained by Teflon due to its stronger electron affinities while the active object becomes positive charged. Once the active object separates from the Teflon surface, the potential difference between the triboelectric layer and the textile electrode layer will gradually increase, resulting in an instantaneous electron flow from the interdigital electrode to a ground and generating an output voltage to the external load. When the two kinds of materials approach each other again, the electrons will flow back from the ground to the interdigital electrode with a reversed output signal appearing.

In addition, the unique working mechanism of the TENG sensor enables it to sense different kinds of materials based on their inherent ability to lose/gain electrons. The amplitude and polarity of the output voltage by the TENG sensing layer change with the different contacting materials. Compared with Teflon used in our sensor fabrication, polyethylene (PE), Nylon, polylactic acid (PLA), Cu, polyethylene terephthalate (PET), natural latex, and polypropylene (PP) tend to lose electrons when they are in contact with Teflon, resulting in a positive voltage signal. On the contrary, Kapton, polyvinyl chloride (PVC), polytetrafluoroethylene (PTFE), and fluorinated ethylene propylene (FEP) exhibit a stronger ability to gain electrons, resulting in a negative voltage signal. Through the comparison of the amplitude and polarity of the output voltage, the tactile senor can identify the type of the contact materials, which may be useful for automatic object sorting and separation in recycling and fabrication processes.

In some embodiments, the triboelectric electrode of the textile triboelectric layer and interdigitated electrodes of the textile-based tactile sensor can be attached to conductors at appropriate sides of the fabric to serve as terminal connections to an interface circuit that detects or measures signals from the electrodes. In some examples, the electrodes are connected to a flexible conductor, such as an electrical wire or conductive thread. In some examples, the electrodes are connected to thin multi-strand insulated wires or TPU-insulated conductive thread. In some examples, the wires or thread are attached to the electrodes of the textile-based sensor fabric using electrically conductive paste. In other embodiments, insulated conductive thread can be directly sewn or stitched through the textile based sensor to contact the electrodes.

In some examples, the interface circuit is a printed circuit board (PCB). The PCB can be a rigid or flexible circuit board. In some examples, the PCB is an ultra-thin flexible PCB.

Other embodiments described herein relate to a system comprising the textile-based tactile sensor described herein. The system can further include a processor and a non-transitory computer readable medium storing machine-readable instructions executable by the processor. Such processor may be implemented as an integrated circuit, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) can be encoded with one or more programs that, when executed on one or more computers or other processors, perform methods that implement the various embodiments described herein. The computer readable medium or media can be transportable, such that the program or programs stored thereon can be loaded onto one or more different computers or other processors to implement various aspects described herein. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects as discussed above. Additionally, it should be appreciated that according to one aspect of this embodiment, one or more computer programs that when executed perform methods of described herein need not reside on a single computer or processor, but may be distributed in a modular fashion amongst a number of different computers or processors to implement various aspects herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The processor is configured to execute the instruction including a machine learning model that is configured to generate an output indicative texture perception and/or material recognition based on the electric signals generated by the triboelectric nanogenerator sensing layer and the piezoresistive sensing layer.

The machine learning model can utilize one or more pattern recognition algorithms, each of which analyze the data provided based on the electric signals generated by the triboelectric nanogenerator sensing layer and the piezoresistive sensing layer and any additional data to assign a continuous or categorical parameter. Where multiple classification or regression models are used, an arbitration element can be utilized to provide a coherent result from the plurality of models. The training process of a given classifier will vary with its implementation, but training generally involves a statistical aggregation of training data into one or more parameters associated with the output class. For rule-based models, such as decision trees, domain knowledge, for example, as provided by one or more human experts, can be used in place of or to supplement training data in selecting rules for classifying a user using the extracted features. Any of a variety of techniques can be utilized for the classification algorithm, including support vector machines, regression models, self-organized maps, fuzzy logic systems, data fusion processes, boosting and bagging methods, rule-based systems, or artificial neural networks.

For example, an SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, a continuous or categorical output value can be determined for a given input feature vector according to its position in feature space relative to the boundaries. In one implementation, the SVM can be implemented via a kernel method using a linear or non-linear kernel.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a rectifier function. The output of the ANN can be a continuous or categorical output value. In one example, a final layer of nodes provides the confidence values for the output classes of the ANN, with each node having an associated value representing a confidence for one of the associated output classes of the classifier.

Many ANN classifiers are fully connected and feedforward. A convolutional neural network, however, includes convolutional layers in which nodes from a previous layer are only connected to a subset of the nodes in the convolutional layer. Recurrent neural networks are a class of neural networks in which connections between nodes form a directed graph along a temporal sequence. Unlike a feed-forward network, recurrent neural networks can incorporate feedback from states caused by earlier inputs, such that an output of the recurrent neural network for a given input can be a function of not only the input but one or more previous inputs. As an example, Long Short-Term Memory (LSTM) networks are a modified version of recurrent neural networks, which makes it easier to remember past data in memory.

A rule-based classifier applies a set of logical rules to the extracted features to select an output class. Generally, the rules are applied in order, with the logical result at each step influencing the analysis at later steps. The specific rules and their sequence can be determined from any or all of training data, analogical reasoning from previous cases, or existing domain knowledge. One example of a rule-based classifier is a decision tree algorithm, in which the values of features in a feature set are compared to corresponding threshold in a hierarchical tree structure to select a class for the feature vector. A random forest classifier is a modification of the decision tree algorithm using a bootstrap aggregating, or "bagging" approach. In this approach, multiple decision trees are trained on random samples of the training set, and an average (e.g., mean, median, or mode) result across the plurality of decision trees is returned. For a classification task, the result from each tree would be categorical, and thus a modal outcome can be used.

In some embodiments, the machine learning model includes an artificial neural network (ANN) that comprises an input layer, output layer and at least one hidden layer configured for function approximation and nonlinear regression. In other examples, the machine learning model may include one or more of a decision tree, a support vector machine, a clustering process, a Bayesian network, a reinforcement learning model, naïve Bayes classification, a genetic algorithm, a rule-based model, a self-organized map, and an ensemble method, such as a random forest classifier or a gradient boosting decision tree). The training process of a given model will vary with its implementation, but training generally involves a statistical aggregation of training data into one or more parameters associated with the output classes.

In some embodiments, all the neurons between every layer are fully connected by each other and the input time-domain signals of each material have i=400 neurons, where $n \in [1, 2, \ldots, N]$ and N is the types of materials that have been used to train the network and output layer are their list number of materials types from 1 to N.

In some embodiments, the input time-domain data of N types of materials are reorganized to N types of a matrix, each input vector and output layer has 400 neurons and 1 neuron, respectively.

In some embodiments, the training input signal for n-th type of material is expressed as $Mn=(Mn,1, Mn,2, \ldots, Mn,720)$ $(n=1, 2, \ldots, N)$, the total input training signal is expressed as $Xdatabase=(M1, M2, \ldots, MN)$, the training function is $f(Xinput)=Youtput$, the output of a neuron (e.g., neuron j) in a hidden layer or the output layer, output j, is a weighted sum of the outputs of all the neurons in the preceding layer, processed by an activation function $yj=f(\Sigma wij\ i\ xi+bj)$ where yj is the output of the neuron j, wij is the weight for the connection between a neuron I in the preceding layer and the neuron j, bj is the bias for neuron j, and ƒ is the activation function for calculating the output of neuron j based on the sum of the weighted inputs to the neuron and its bias.

In some embodiments, the system and textile-based tactile sensor described herein can be used for monitoring various physiological signals and joint motions of wearers in a real-time manner when it is deployed at different body parts. For example, when the textile-based sensor is attached to the throat region of a volunteer, it can accurately sense the muscle movement at the throat region when speaking and thereby recognize the voice patterns. The sensor can recognize the different words spoken by the person in a sentence through the unique signal patterns detected through the different epidermis movements induced by laryngeal prominence. Furthermore, the sensor demonstrates good repeatability in recognizing the specific words in speaking. For example, when the volunteers say the same word "hello" repeatedly five times, it obtains nearly identical signal patterns of voice signals. Therefore, this sensor has the potential to be used for natural language-based human-machine interfaces and phonation rehabilitation exercises.

In personalized healthcare, vital physiological signals, such as heart or pulse rate, are valuable information for evaluating the medical conditions of patients with cardiovascular disease. The textile sensor can be attached onto the wrist surface of a volunteer to monitor the pulse rate and pulse waveform in a real-time manner. Furthermore, from the recorded regular and repeated signal patterns, the sensor is able to distinguish the three characteristic peaks of a standard pulse waveform, i.e., "P" (percussion wave), "T" (tidal wave), and "D" (diastolic wave), indicating the great potential of such sensors in biomedical applications.

The textile sensor further worked as a motion detector to record the current response under bending-releasing cycles when mounted at the joints of the human body, such as elbow, wrist, knee, and ankle. If the piezoresistive sensor is directly attached on the elbow, the sensor is compressed as the elbow bends, causing an increase of conductive pathway and thereby a decrease of the conducting resistance and an increase of the current. When the bending angle decreases, the current signal becomes smaller. Similarly, the sensor is capable of accurately detecting the bending motions of the wrist and knee. The sensor attached to the ankle joint can detect and discriminate human movement states. When the person is walking or running, the amplitude and frequency of human motion are quite different, which can be reflected through the induced current change in the sensor at different motion states. The sensor can be readily utilized for detecting kinematic signals and joint motions and should promising applications in the fields of personalized health monitoring, human-machine interface, athletic performance monitoring, and patient rehabilitation.

The sensor can also recognize the surface morphology or texture. For the surface morphology and texture recognition the TENG sensor works in a single-electrode-based sliding mode. As the sensor slides on the sample surface, the fingerprint-like steel/Teflon fiber contacts and separates with the ridges of the micropatterns, resulting in the corresponding variations of the voltage signals.

The observed voltage signals decrease with the increasing wavelength of the periodic patterns at the same scanning speed. The voltage signals in the frequency domain obtained by Fast Fourier transform (FFT) can give the characteristic frequencies that agree with the spatial frequencies of the micropatterns. For a defined texture pattern, the number of voltage signals and the corresponding characteristic frequencies increase with the scanning speeds.

The tactile sensor can further sense the relative hardness of objects through a simple operation mechanism. When the tactile sensor contacts or separates with the touching objects, the TENG sensing layer generates instantaneous negative and positive voltage signals due to the contact electrification, respectively. In comparison, the pressing and releasing motions are detected by the recorded signals from the piezoresistive sensing layer. The up-hill side and down-hill side of a current curve represented the pressing and releasing state, and the current value increases with the hardness of the object because a larger hardness results in a large pressure applied to the sensor. Such a sensing capability enables the use of the new tactile sensors in advanced manipulations such as fruit picking to avoid potential physical damage.

Figure 7A:
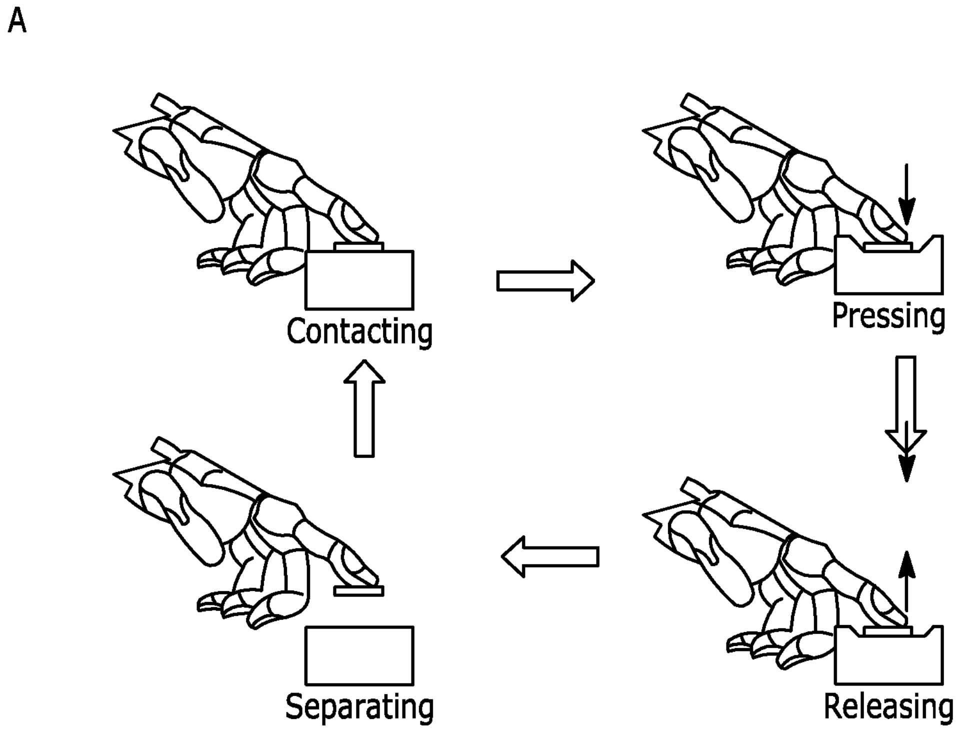
FIGS. 7(A-E) illustrate the demonstration of the textile based tactile sensor for resolving complex stimuli and controlling soft robots. (A) Schematic of the detection of the touching objects using a soft robotic hand equipped with our tactile sensors on its fingers. (B) Real-time signals of the tactile sensors induced in the touching process with an object. The triboelectric layer generates instantaneous pulse voltage signals once it contacts or separates with an object. The current signal can be used to identify the relative hardness of the touched object in the pressing and releasing processes. (C) Schematic diagram of the remote soft robotic control system using our tactile sensor as a human-machine interface (ADC: analog-digital converter). (D) Real-time signals of the tactile sensors generated at five different operation states: three bending angles of the wrist and switching on and off by finger. (E) Photographs of the soft robotic manipulator and human arm under different control commands controlled by the sensor, which are compounding to the control signals shown in (D).
Figure 7B:
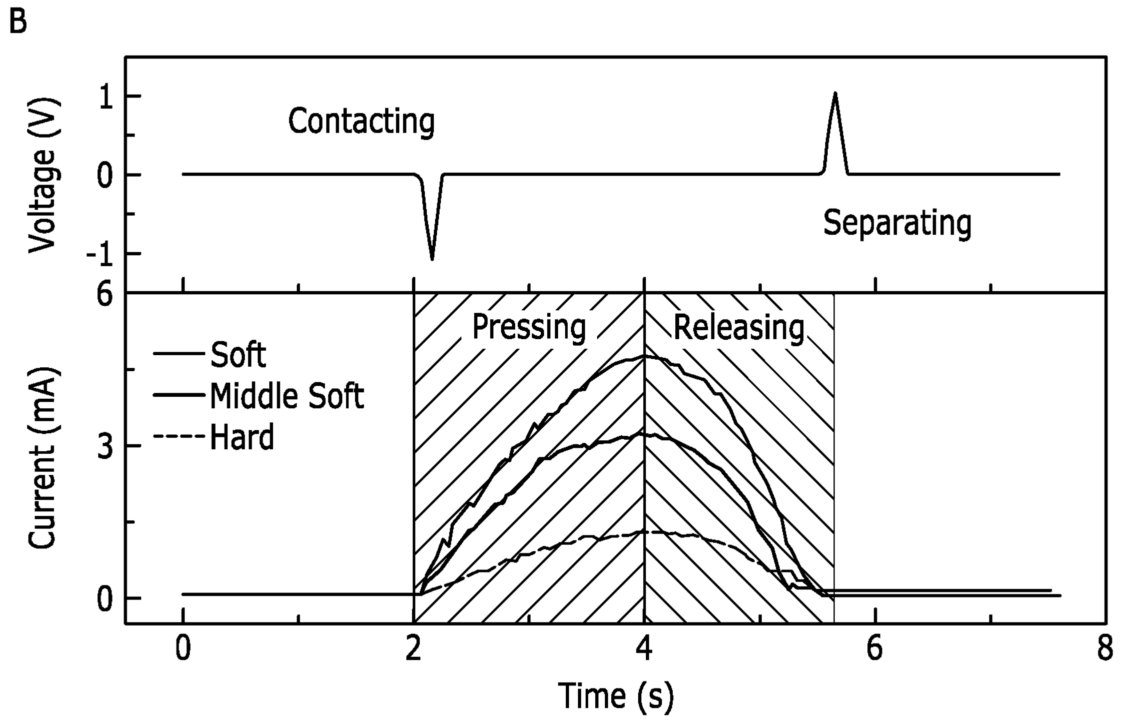
Figure 7C:
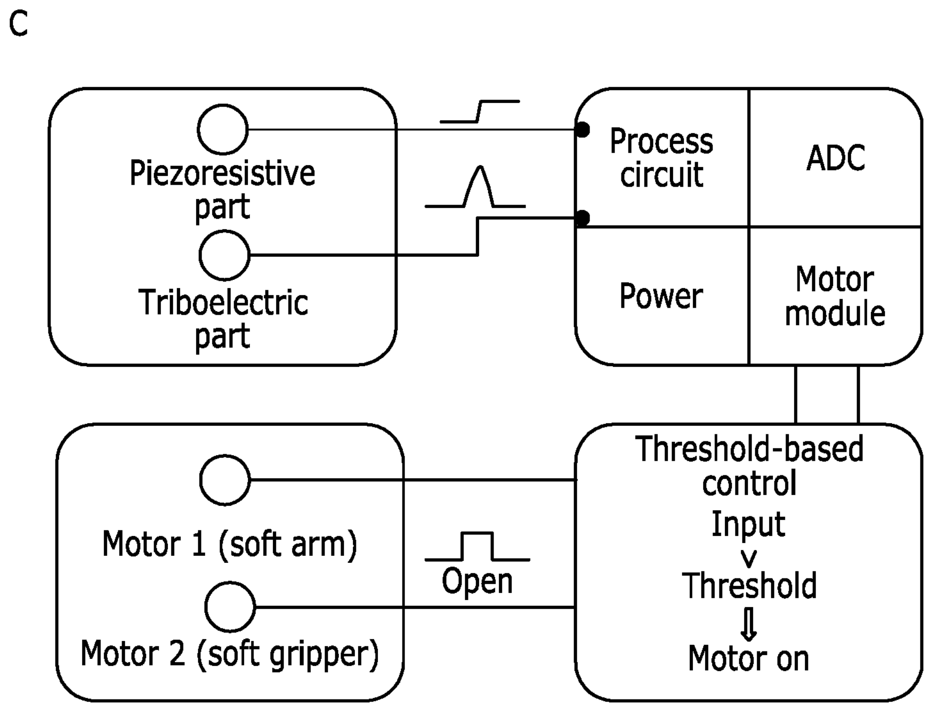
Figure 7D:
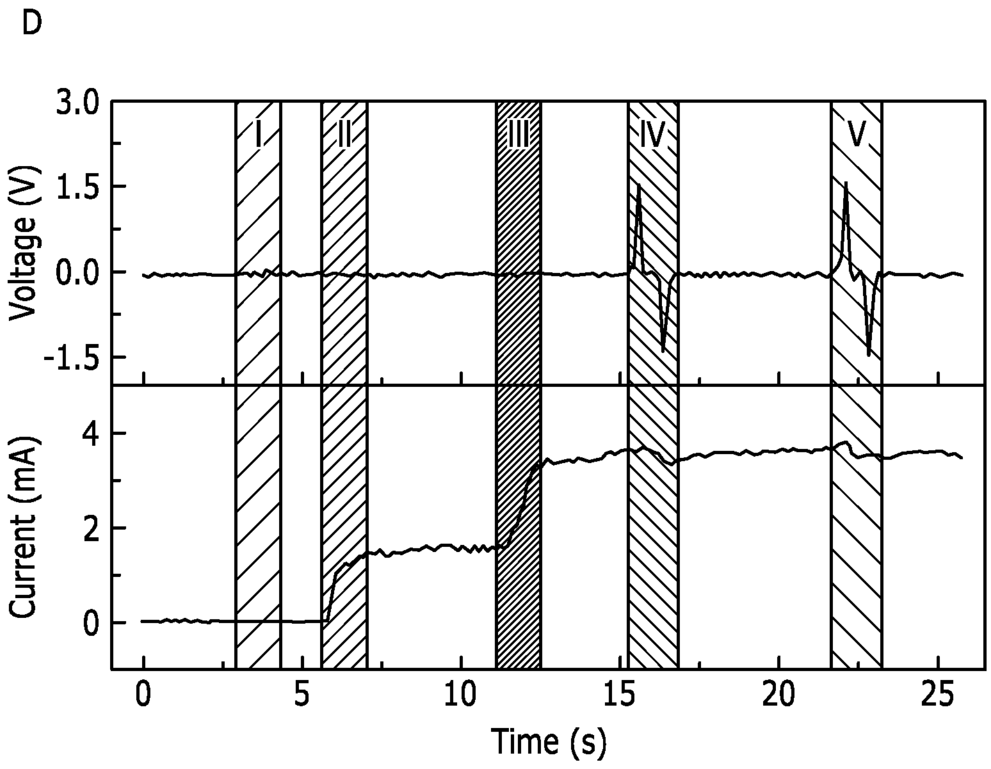
Figure 7E:
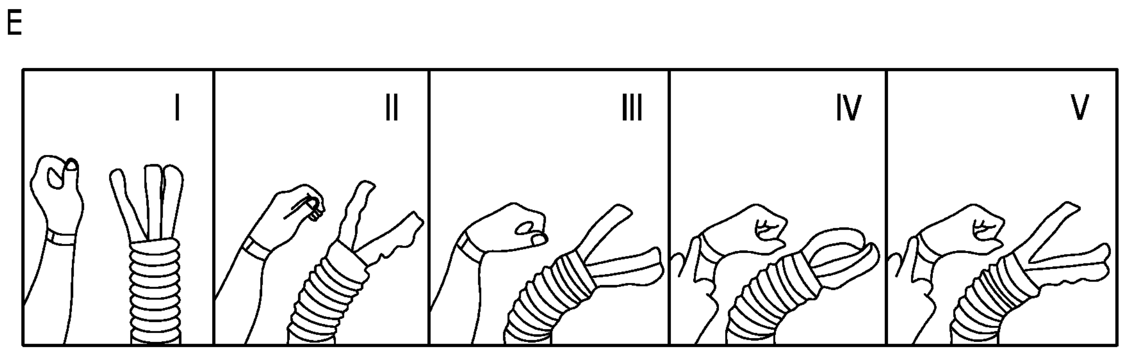

The tactile sensors can be further used as an effective human-machine interface to control a soft robotic manipulator. As shown in FIG. 7C, the whole system consists of a soft robotic gripper, a soft arm, a signal processing and transmitting module, and a tactile sensor. The control signals performed by the human (e.g., wrist bending and sensor pressing) are first processed and sent to the analog ports of an Arduino board in the circuit. Then, the analog-to-digital converter (ADC) converts the analog signals into digital values and transmits them to a control board. After that, the received signals can be compared with the pre-defined thresholds to determine whether and how to activate the DC motors to actuate the soft manipulator. FIGS. 7D and E illustrate the real-time signals recorded in the manipulation and the corresponding motion states of a soft robotic manipulator. In the original state (I), the tactile sensor is attached on the wrist and the soft arm is vertically standing on a table. When the human wrist bends (II), a continuous current signal output is detected due to the flexion of the wrist, and thereby the soft arm bends to the right side with a small bending angle. In state III, the wrist ends to a larger angle, the current signal increases further, leading to a larger bending angle of the soft robotic arm. When the tactile sensor is pressed slightly using a finger (IV), the induced voltage signal in the TENG sensing layer actuates the grasping operation of the soft gripper. When pressing the sensor again, the soft gripper can open its fingers to its initial releasing state (V). It is expected that our textile tactile sensor can be used as a useful human-machine interface for controlling soft robots to complete more complex tasks in the future.

The textile-based multifunctional tactile sensor described herein can mimic the SA and FA mechanoreceptors of human skins through the integration of triboelectric and piezoresistive sensors. The piezoresistive part utilizes CNT-textile as piezoresistive materials shows a high sensitivity of 11.2 $kPa^{-1}$, short response time (<40 ms), and good stability. The TENG-based sensing part fabricated by stitching Teflon-steel yarns onto a cotton textile successfully achieves the functionality of FA mechanoreceptor. With these superior performances of the two components, the textile tactile sensing layer can monitor various human physiological signals and human joint motions in a real-time manner. Other potential applications include material identification and texture recognition with the assistance of an ML-based approach. Moreover, the device also enables the detection of complex stimuli and controlling of soft robotics as a wearable human-machine interface.

EXAMPLE

In this Example, we describe a textile-based tactile sensor for multifunctional sensing applications in health monitoring and soft robotics (FIG. 3). Inspired by the fingertip skin, we rationally design the tactile sensor with two sensing layers (FIGS. 3A and B): a piezoresistive layer for mimicking the SA mechanoreceptor, and a triboelectric layer with fingerprint-inspired microlines for mimicking FA mechanoreceptor. This tactile sensor has the ability to perceive complex and combined mechanical stimuli, owing to its delicate fingerprint patterns and effective sensory receptors (FIG. 3C). With cotton fabric as the substrate material, the as-developed tactile sensors can easily conform to different body parts for health monitoring or complex surfaces of soft robotics for intelligent perceptions. The tactile sensors are demonstrated as wearable devices to monitor the voice, physiological signals, and joint motions of humans (FIG. 3D). Moreover, we develop a machine learning (ML)-based framework to integrate it with our tactile sensors for texture perception and material recognition. Finally, we demonstrate the use of the tactile sensor as a human-machine interface for assistive robotic control. This technology may significantly advance the development of wearable sensing devices and soft robotics.

MATERIALS AND METHODS

Fabrication of Textile Sensors

A 10×10 $mm^2$ cotton textile was dipped into a CNT solution for 10 s and dried on a hot plate for 10 min at 70° C. to evaporate the solvent. This dip-coating and drying process was repeated for about 10 cycles and the color of the textile changed from white to black. Then, cotton textile was covered by a tape tightly as a mask layer. An interdigital electrode pattern was designed by AutoCAD and then written onto the surface of the tape without damaging the textile substrate by using a computer-controlled commercial laser cutter system (Glowforge plus). Cu ink was coated on the surface of the cotton textile with a mask by a brush coating method and dried in a vacuum oven for about 1 h. Commercial Teflon/steel fiber was stitched onto a cotton textile to assemble a signal electrode triboelectric sensor. Finally, the electrode layer, CNT-coated piezoresistive layer, medical textile tape, and triboelectric layer were integrated together.

Morphological Characterization

The microstructures of the CNT-coated textile and the stain-Teflon fiber were characterized using a Zeiss Auriga Cross Beam. The photo-graphs of the micropatterns were characterized using optical microscopy (Olympus SZX12).

Measurements of the Sensing Performance

The current and voltage signals were measured by a current preamplifier (Keithley 6514 System Electrometer) and a digital storage oscilloscope (GDS-2202). A linear motor (LinMot MBT-37 120) was employed to apply different pressures onto the device. The software LabVIEW was programmed to acquire real-time control and data extraction. A force gauge (ZP-100 N) was used to detect applied pressure.

Modeling of the Sensing Mechanism

The potential distribution of the TENG sensor was simulated by using the software package COMSOL. For simplicity's purpose, the TENG sensor is treated as a parallel-plate capacitor in the established model, where the Teflon plate with steel electrode was placed parallelly with the PE plate. The triboelectric charge density on the inner surface of the Teflon plate was assigned as 1 μC/$m^2$.

Machine Learning for Material Recognition

All the neurons between every layer are fully connected by each other and the input time-domain signals of each material have i 400 neurons, where n∈[1, 2, . . . , N] and N is the types of materials that have been used to train the network and output layer are their list number of materials types from 1 to N. We used the 'fitnet' function in the software package MATLAB to develop fully connected propagation ANNs, which has an input, output, and one or more hidden layers designed for function approximation and nonlinear regression. Compared to the CNN net, we use the time domain signal other than material figures as input, and the material label is used as a regression target. In this process, the input time-domain data of N types of materials are reorganized to N types of 400×720 matrix. For each input vector and output layer, we have 400 neurons and 1 neuron, respectively. The training function can be regarded as $f(X_{input})\ Y_{output}$. The different numbers of neurons in hidden layers are used to optimize the training accuracy of ANN. In our analysis, ten neurons in the three hidden layers are chosen to predict the material types from the tested signals.

Machine Learning Method

Figure 15B:
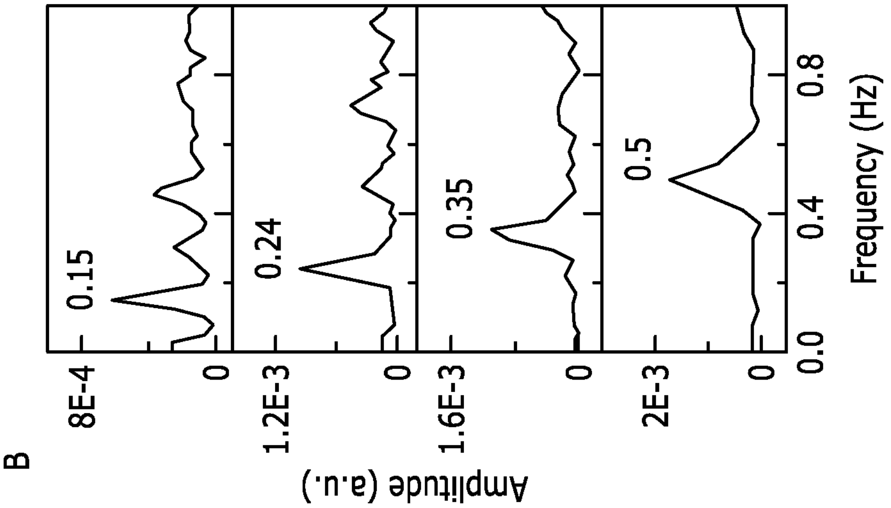
FIGS. 15(A-B) illustrate (A) Voltage signals obtained by the triboelectric sensing layer when scanning over a specific pattern with different scanning speeds. The wavelength of the pattern is 2 mm. (B) The voltage spectra in frequency domain obtained by Fast Fourier transform (FFT).
Figure 15A:
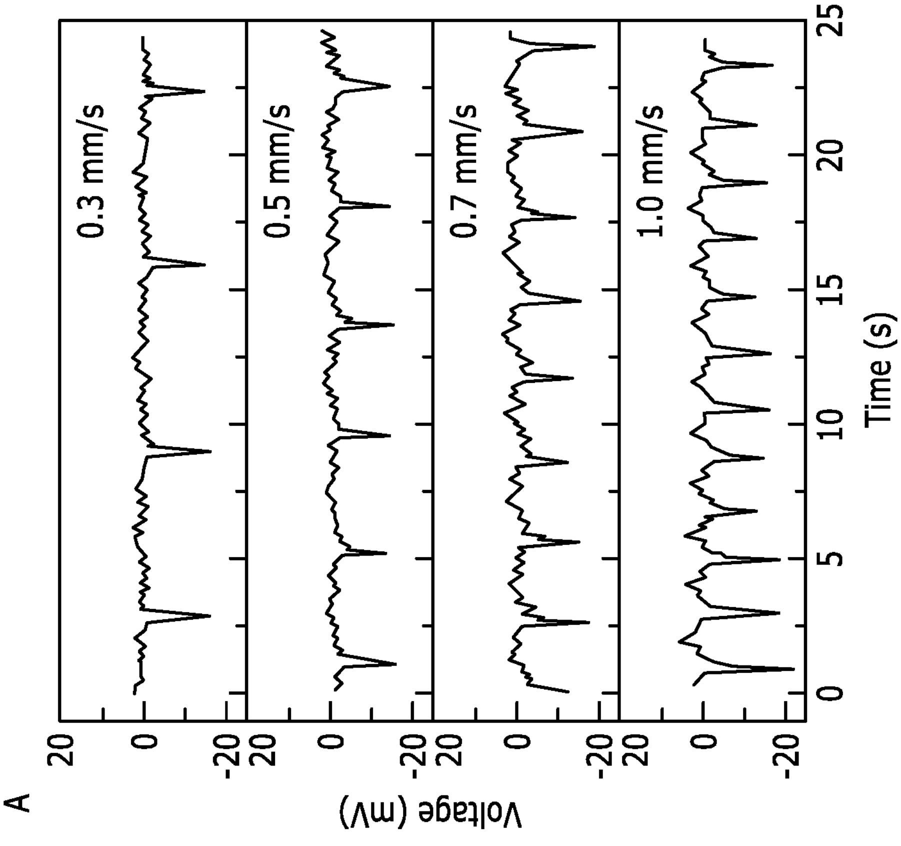
Figure 16:
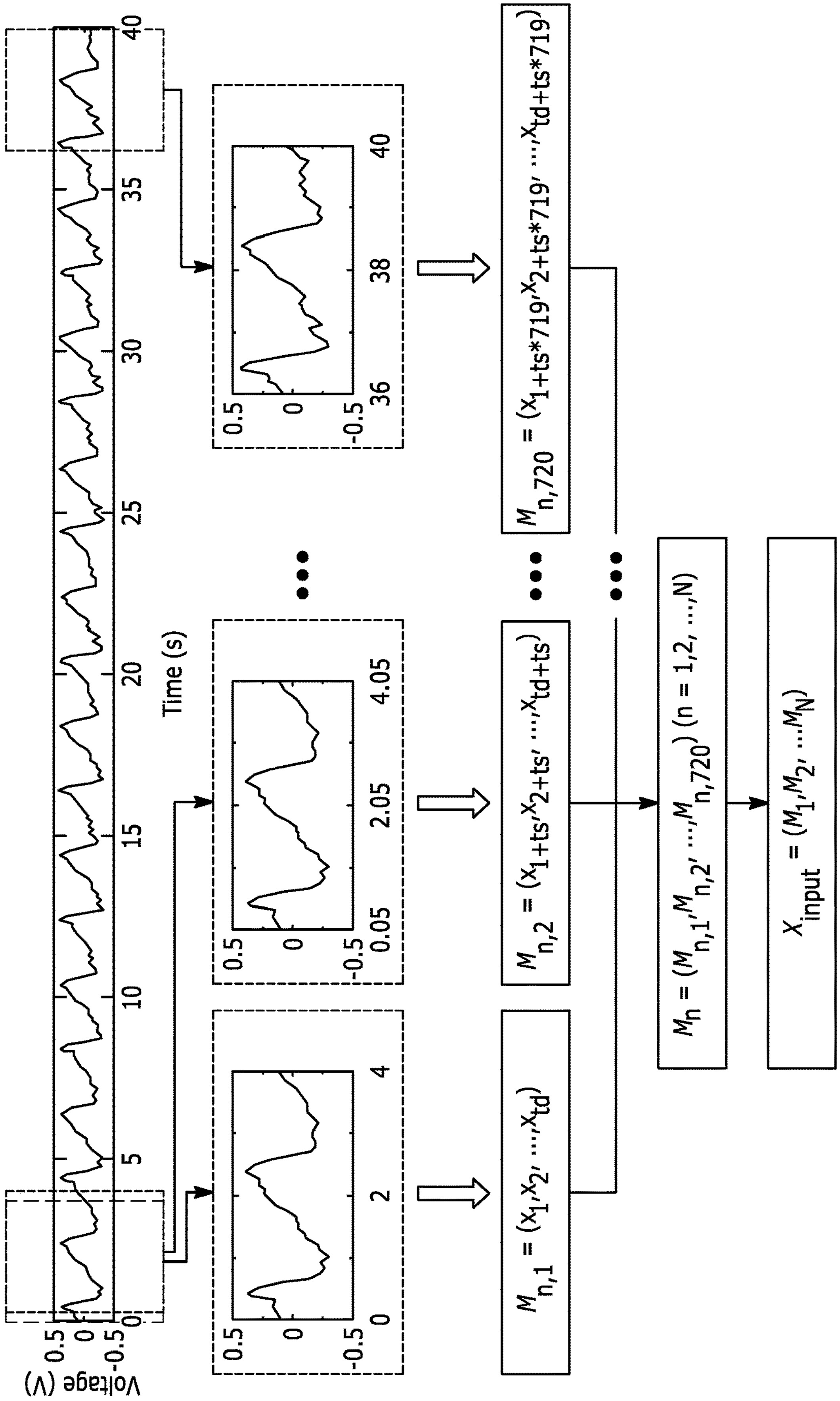
FIG. 16 illustrates the method for database generation from original testing data.

FIG. 15 shows the method of database generation from original testing data. Here the tested data are selected as an example to show the process of the generation. The data length is 4 s for every sample. For the time-domain signal, random prediction at every signal time for different materials is very challenging. Thus, to cover every detail of the material tested signal in the training process, the signal length has been selected as 4 s which is a little larger than one cycle range of the tested signal of all N types of materials. For each material, the testing data for a 40 s period has been selected to build the training database. The 40 s signal is split into α=720 samples. The time-domain signal of each sample is represented as $M_{n,\alpha}=(x_{1+ts+\alpha-1}, x_{2+ts+\alpha-1}, \ldots, x_{td+ts+\alpha-1})$, where n is the material label, td is the total unit number of the sample, ts is the single selected region moving step, and x is the unit of the tested signal. We move the selected rectangular dashed region as shown in FIG. 14 from beginning to end. The moving step is ts=0.05 s. Thus, the training input signal for n-th type of material can be expressed as, $$M_n = (M_{n,1}, M_{n,2}, \ldots, M_{n,720})(n = 1, 2, \ldots, N)$$

Considering the N types of materials that have been tested, the total input training signal can be expressed as, $$X_{database} = (M_1, M_2, \ldots, M_N)$$

The training function can be regarded as $f(X_{input})=Y_{output}$. The output of a neuron (e.g., neuron j) in a hidden layer or the output layer, output j, is a weighted sum of the outputs of all the neurons in the preceding layer, processed by an activation function.

$$y_j = f\left(\sum_i w_{ij}x_i + b_j\right)$$

where $y_j$ is the output of the neuron j, $w_{ij}$ is the weight for the connection between a neuron I in the preceding layer and the neuron j, $b_j$ is the bias for neuron j, and $f$ is the activation function for calculating the output of neuron j based on the sum of the weighted inputs to the neuron and its bias (we used the default tangent sigmoid function 'tansig' in MATLAB).

Figure 17B:
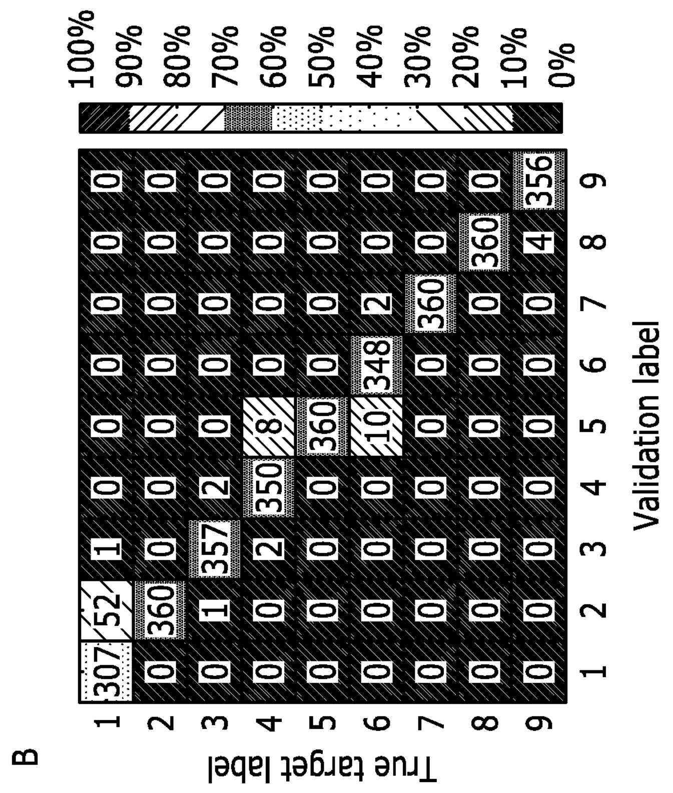
FIGS. 17(A-B) illustrate (A) the variation of the training mean squared error with the number of training epochs. (B) the confusion map for machine learning outcome in predicting materials from M1~M9.
Figure 17A:
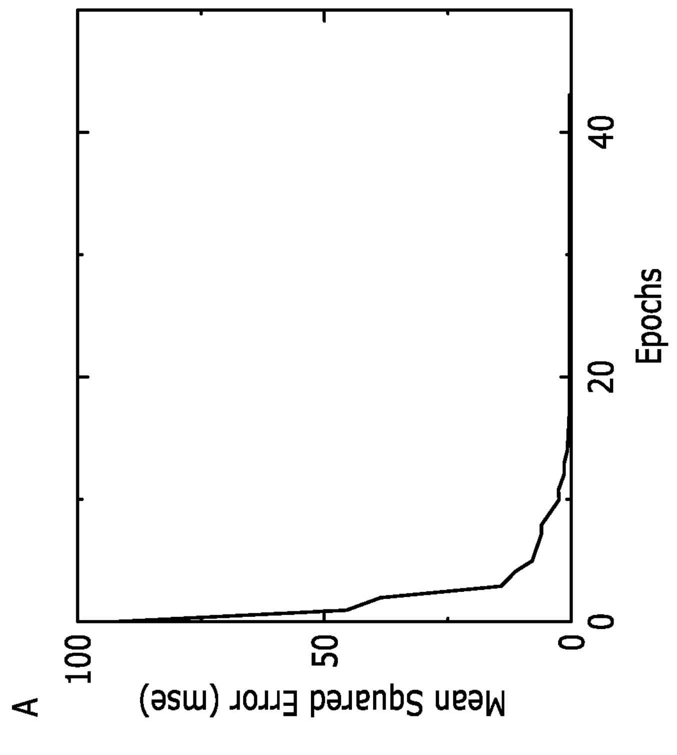
Figure 18B:
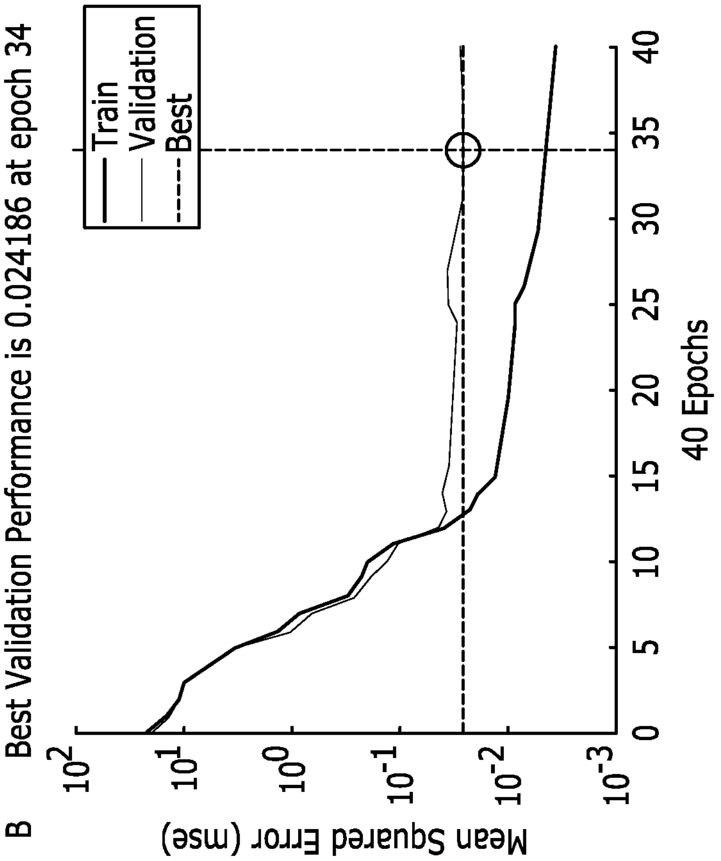
FIGS. 18(A-B) illustrate (A) the regression plot and (B) the development of training mean squared error (MSE) with training epochs for a net with 10 neurons in the 3 hidden layers.
Figure 18A:
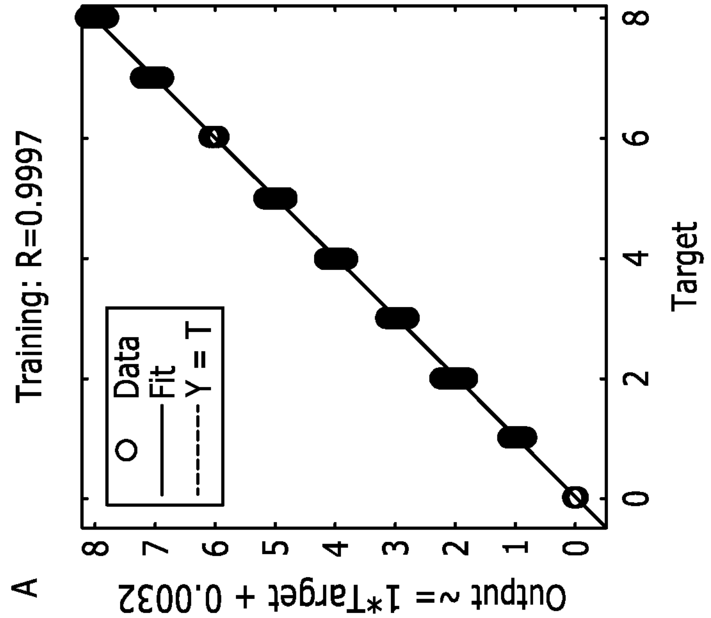

We used the 'fitnet' function in the MATLAB software package to develop fully connected propagation ANNs. This type of ANN has an input, output, and one or more hidden layers designed for function approximation and nonlinear regression. We use the label list as the output; thus the material will be regarded as the same materials when the difference between the output value and true value of the material label is less than 0.5 because the value difference between the two adjusted labels is 1. The regression value for each material can be accepted with $y_j$<n±0.5. The input time-domain data of N types of materials are reorganized to an N type of 400×360 matrix. For each input vector and the output layer, we assign 400 neurons and 1 neuron, respectively. FIG. 17A shows the training error and validation results using 10 neurons in the 2 hidden layers. To demonstrate the training accuracy, all the data in the training dataset was used to validate the training of ANN. As shown in FIG. 17B, the training accuracy reaches up to 97.56%.

RESULTS

Design and Fabrication of Skin-Inspired Tactile Sensors

Human skin has four types of mechanoreceptors that are distributed over different regions of human skin to perceive static and dynamic mechanical stimuli. As shown in FIG. 1A, the two slow adapting mechanoreceptors (SA-I and SA-II) of fingertip skin can sensitively respond to low-frequency stimuli and produce a sustained signal to describe the static properties of a sustained stimulus. In contrast, the two fast adapting mechanoreceptors (FA-I and FA-II) can detect dynamic pressure or vibrations, which is essential for texture discrimination and slip detection. Novel tactile sensors that can mimic the SA and FA mechanoreceptors are highly desired for humanoid robots, intelligent prostheses, and wearable health monitoring devices.

Figure 3A:
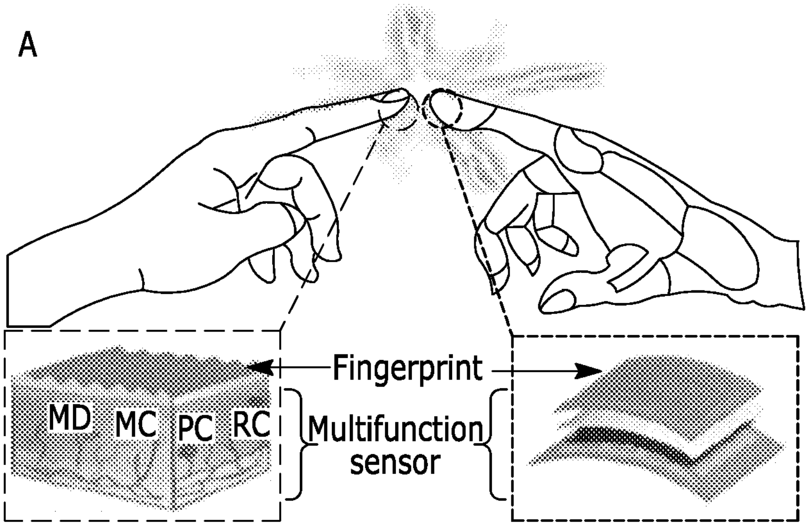
FIGS. 3(A-D) illustrate skin-inspired, self-powered, textile tactile sensors for multifunctional sensing in wearables and soft robotics. (A) Schematic of the skin-inspired all-textile tactile sensors capable of multifunctional tactile sensing. The basic structure of human skin versus all-textile tactile sensors (bottom); human skin has slow-adapting (SA) mechanoreceptors [Merkel (MD) and Ruffini corpuscles (RE)] for static stimuli, fast-adapting (FA) mechanoreceptors [Meissner (MC) and Pacinian corpuscles (PC)] for dynamic stimuli. (B) Detailed structure of the textile tactile sensors. (C) Schematics and representative output signals of the triboelectric sensor layer (top) and piezoresistive sensor layer (bottom) when subjected to pressure force. The triboelectric sensor can generate instantaneous pulse voltage signals at the moments of touching and separation with external dynamic stimuli as FA mechanoreceptors in human skin. The piezoelectric sensor has a similar function with the SA mechanoreceptors for detecting static or slowly varying stimuli. (D) Multifunctional applications of the textile sensors in health monitoring, material discriminating, and human-machine interface.
Figure 3B:
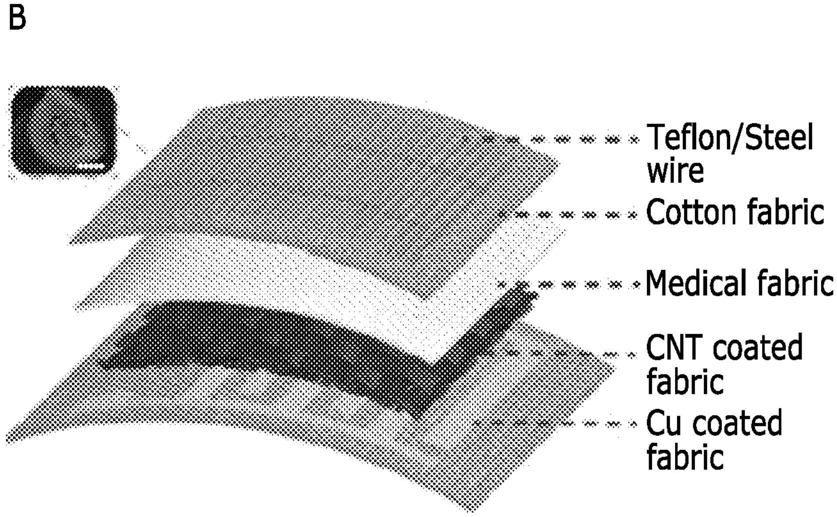
Figure 8A:
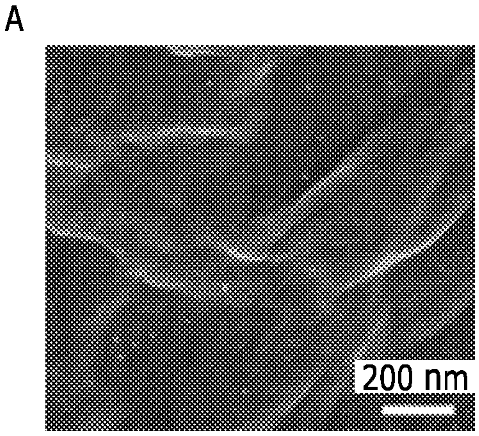
FIGS. 8(A-B) illustrate scanning electron microscopy (SEM) images of (A) the CNT-coated textile and (B) the steel/Teflon fiber.

To achieve the required functionality, we design the textile-based tactile sensor by integrating a piezoresistive sensor for mimicking the SA mechanoreceptor and a triboelectric sensor with fingerprint-inspired microlines for mimicking FA mechanoreceptor (FIG. 3B). The tactile sensor consists of a Cu-coated textile electrode layer, a carbon nanotube (CNT) coated piezoresistive sensing layer, a medical textile layer, and a top triboelectric layer. Cotton fabrics are utilized as the substrate material since they are soft, breathable, and comfortable to human skin. Two electrodes with interdigitated configurations are fabricated via brush coating Cu ink on the cotton fabrics. The CNT-coated piezoresistive textile layer is fabricated by a low-cost and simple dip-coating method, stacking on top of the interdigitated electrodes. FIG. 8A shows the scanning electron microscopy (SEM) image of the CNT-coated textile, indicating that the CNTs are uniformly covered on the surfaces of textile fibers. To encapsulate the electrodes, a biocompatible medical textile tape is bonded on the top of the CNT-coated textile to ensure a conformal contact between the CNT-coated textile and the electrodes and prevent mutual interference between the two different sensing layers.

Figure 3C:
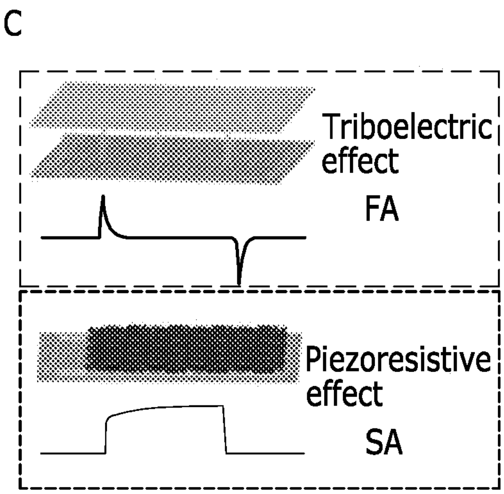
Figure 3D:
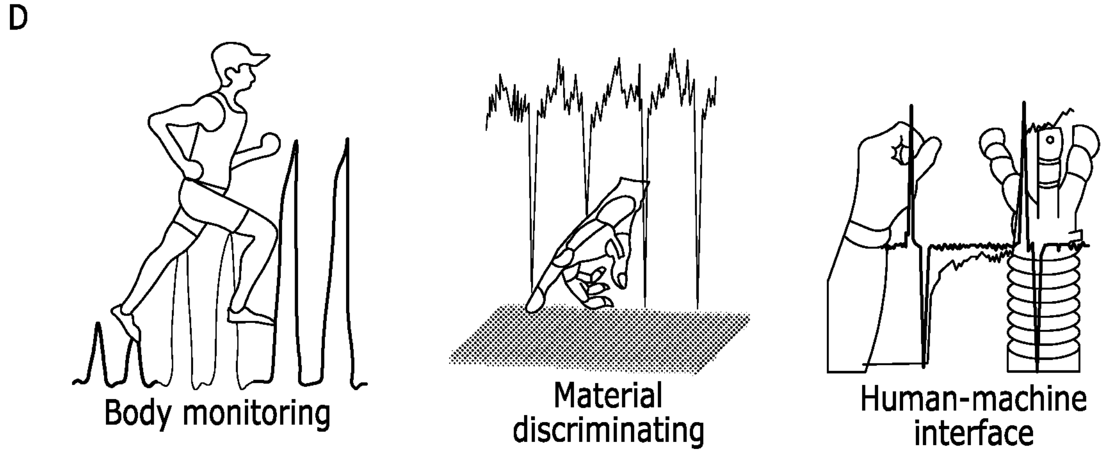
Figure 8B:
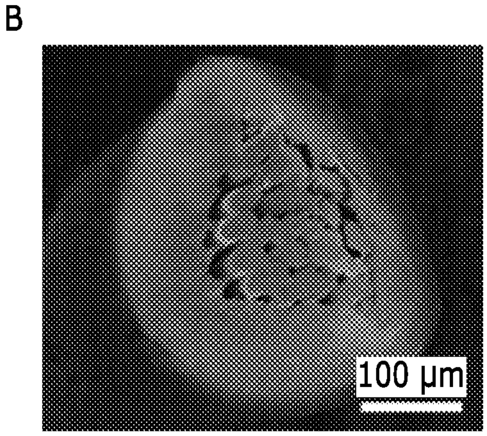
Figure 9:
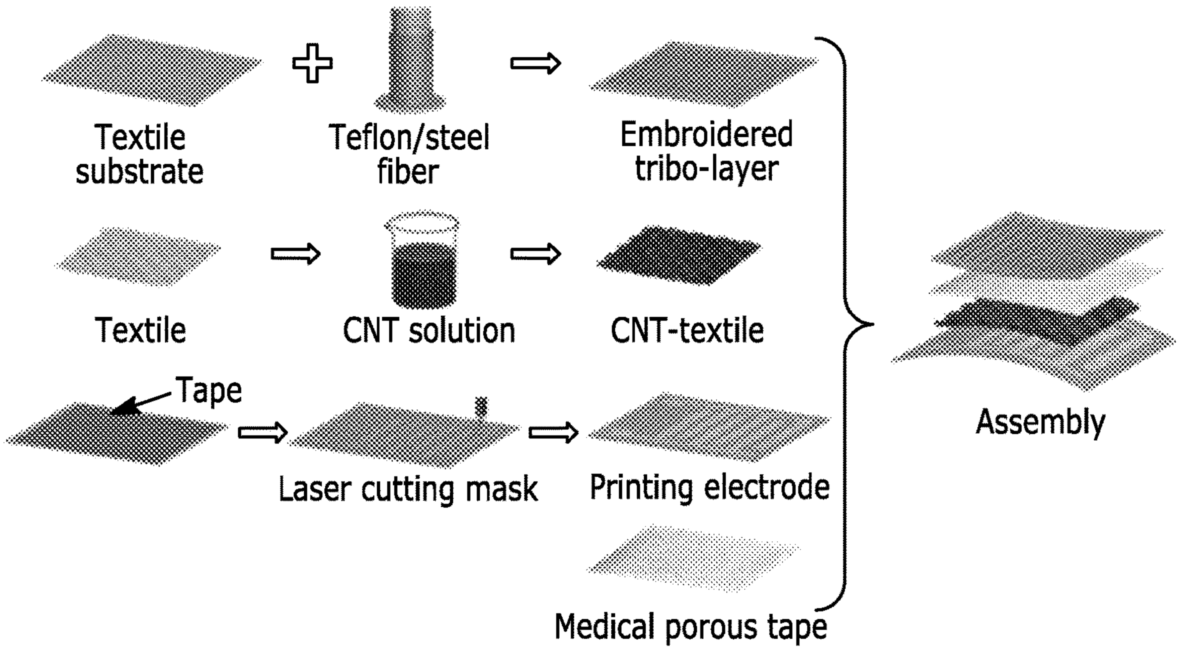
FIG. 9 is a schematic illustration of the fabrication process for the all-textile based tactile sensors.

Different from the previous fingerprint-like patterns fabricated with lithography methods, we utilize a facile approach to assemble a single-electrode triboelectric nanogenerator-based sensor by stitching structured core-shell (Teflon-steel) yarns (diameter~300 μm, FIG. 8B) onto the cotton textile. The steel fiber core works as the conductive electrode while the Teflon shell layer serves as the dielectric material for triboelectrification because compared with other triboelectric materials such as PDMS and PET, Teflon exhibits a stronger ability of electron attraction and good mechanical strength. Similar to the FA mechanoreceptor of skin, the triboelectric sensing layer generates a pulse electrical signal only at the moment of contact and separation with a mechanical stimulus. On the contrary, the piezoresistive sensing layer produces a maintained electrical signal during sustained indentation like the SA mechanoreceptor (FIG. 3C). Based on the synergistic effect of the triboelectric sensor and the piezoelectric sensor, our tactile sensor has the ability to detect complex physical stimuli such as human body motion, material discrimination, and work as a human-machine interface for the control of soft robotics (FIG. 3D).

Characterization of the Piezoresistive Sensing Layer

Figure 4A:
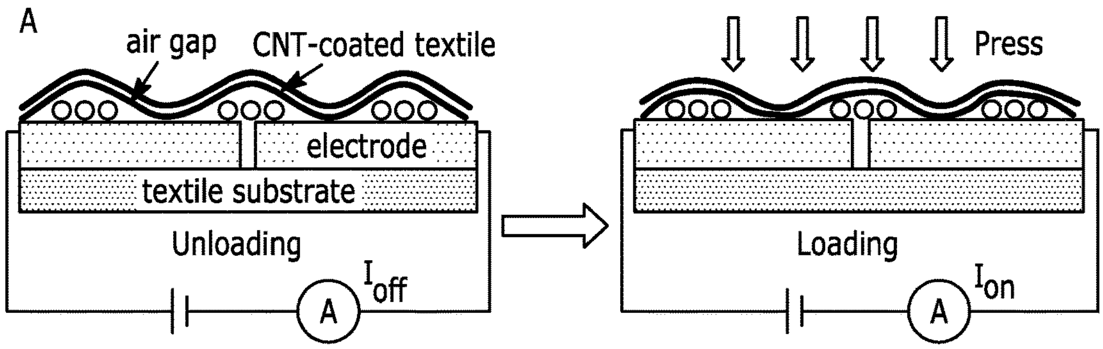
FIGS. 4(A-H) illustrate the characterization of the piezoresistive sensing layer in the textile-based tactile sensor. (A) Schematic illustration of the working mechanism of the textile-based piezoresistive sensor layer. (B) Current responses of the tactile sensor under loading and unloading conditions. (C) I-V curves of the tactile sensor under different applied pressures varying from 1 kPa to 22.5 kPa. (D) Pressure sensitivity of the tactile sensor measured with different applied pressures. The pressure sensitivity $(S=(\Delta I/I_0)/\Delta P)$ is estimated as 11.2 $kPa^{1}$ in the range of 0.5 kPa to 11 kPa and 3.1 $kPa^{1}$ in the range of 13.5 kPa to 33.5 kPa. (E) Real-time measurements of the relative current change by the tactile sensor under three cyclic loadings/unloading at different pressure levels. (F) The response time (40 ms) and recovery time (20 ms) of the tactile sensor in operations. (G) The current response curves of the sensor when loaded with a plant leaf (70 mg) and a seed (180 mg). The insets are the optical images of the leave and the seed in testing. (H) Reliability and stability tests of the textile sensor under the conditions of loading/unloading pressure of 10 kPa for 1500 cycles.
Figure 4B:
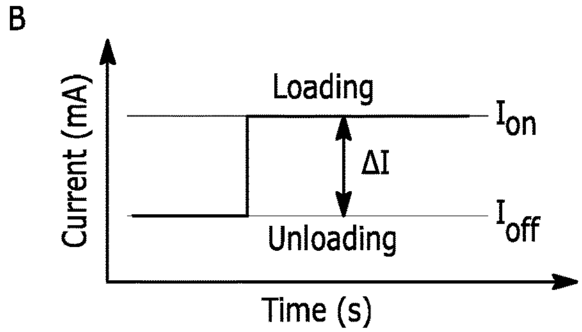

FIG. 4A illustrates the sensing mechanism of the proposed piezoresistive sensor layer. Different from a bulk rigid planar metal, the CNT-coated textile and the Cu-coated textile electrode layer have porous structures and rough surfaces. The contact area between the CNT-coated textile and the bottom electrodes changes as the applied external pressure varies. As shown in FIG. 4B, when the external pressure is applied onto the sensor surface, the porous structures deform, leading to the approaching and/or contact between the CNT-coated textile and the interdigital electrodes. This deformation generates a larger contact area and more conductive pathways between CNTs and Cu electrodes, leading to a significant increase of the current under an applied voltage.

Once unloading, the CNT-coated textile and the bottom Cu electrode textile restore to their original states, resulting in the reduction of conductive pathways and thereby the decrease of the current.

Figure 4C:
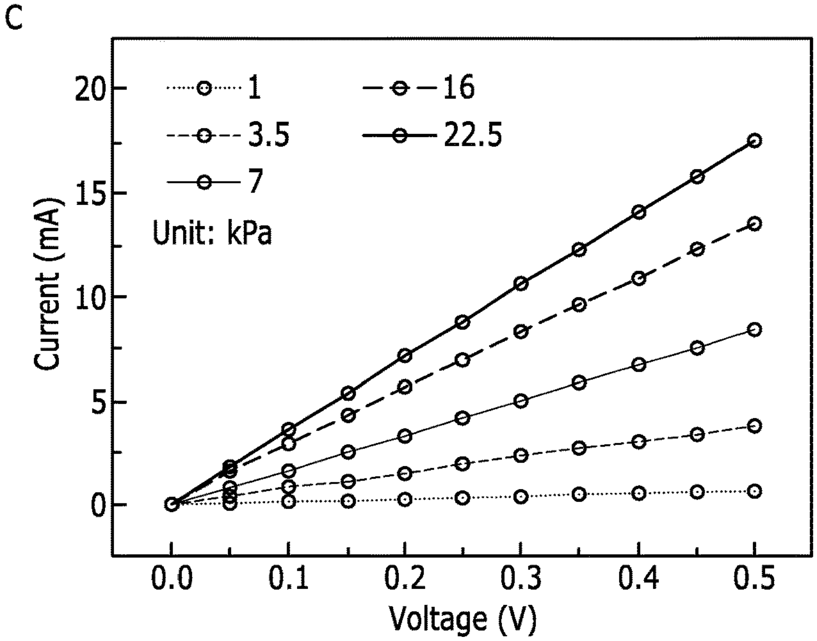
Figure 10:
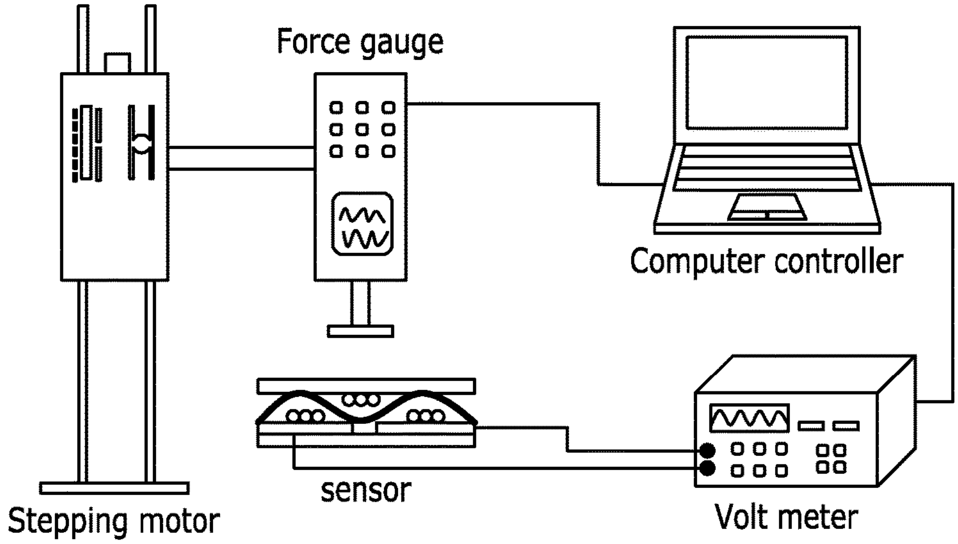
FIG. 10 is a schematic illustration of the experimental setup for the performance testing of the tactile sensors.
Figure 11:
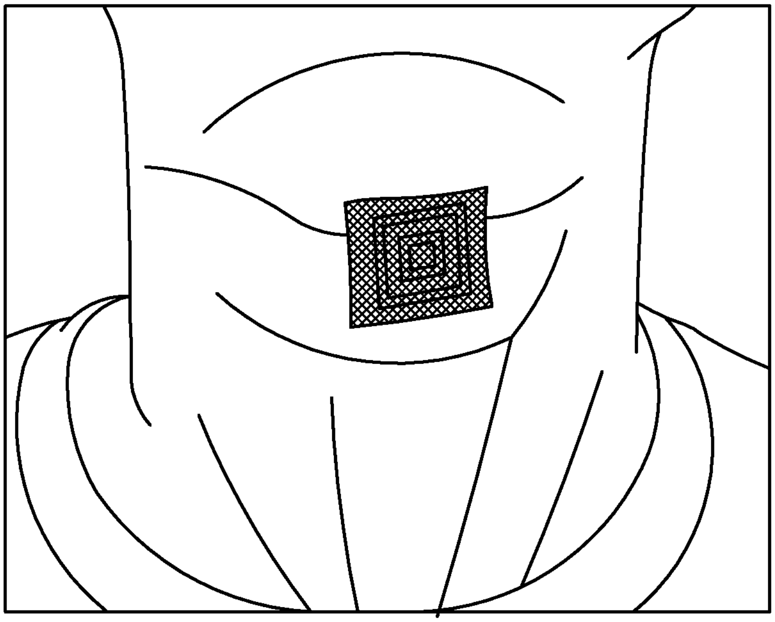
FIG. 11 is a photograph of the demonstration of the tactile sensor attached on the throat skin of a volunteer to detect muscle movement during speech for voice recognition.

We build an electrical signal testing platform to measure the sensing performance of the textile sensor devices (FIG. 10). As shown in FIG. 4C, the current-voltage (I-V) curves of the piezoresistive sensor exhibit excellent linear relationships under a specific static pressure loading, indicating that the CNT-coated textile and the Cu electrode textile form ohmic contacts. It is also demonstrated that the piezoresistive sensor exhibits high sensitivity and reliability for a wide range of applied pressure. We also observe that the slope of the I-V curve significantly increases with the applied pressure, indicating that the electrical resistance of the sensor device reduces continuously, which is consistent with the underlying sensing mechanism.

Figure 4D:
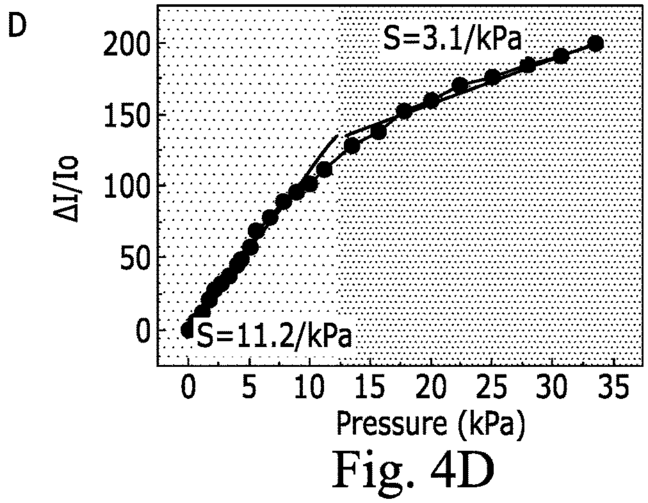
Figure 4E:
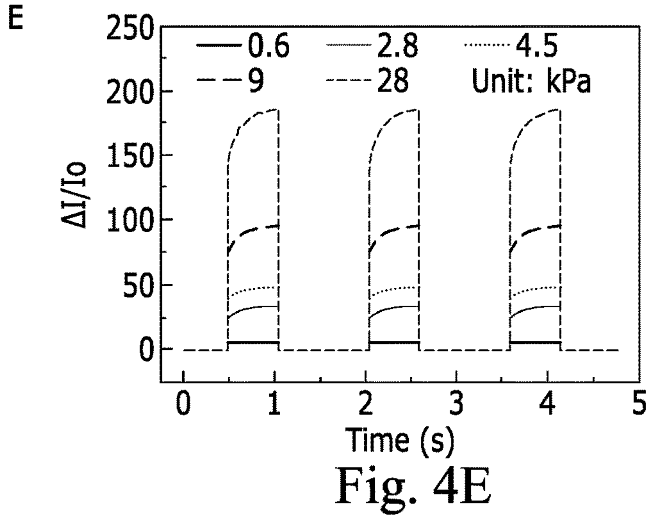
Figure 4F:
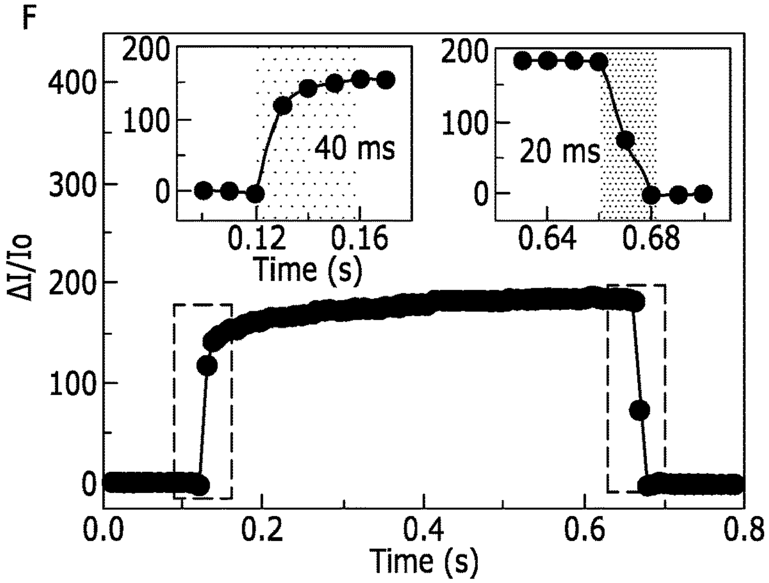
Figure 4G:
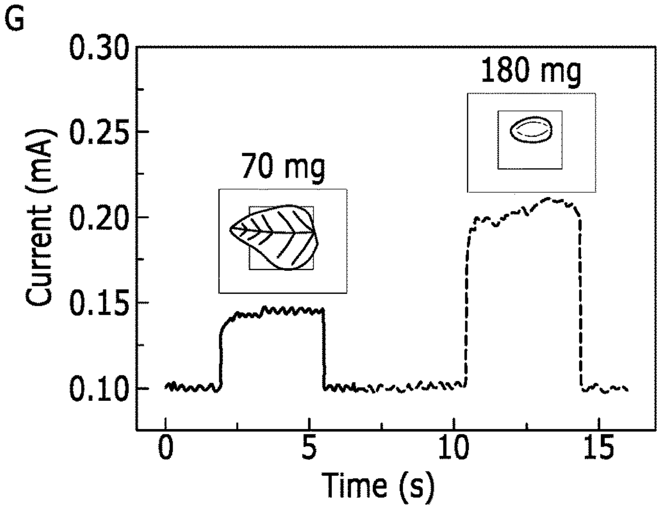
Figure 4H:
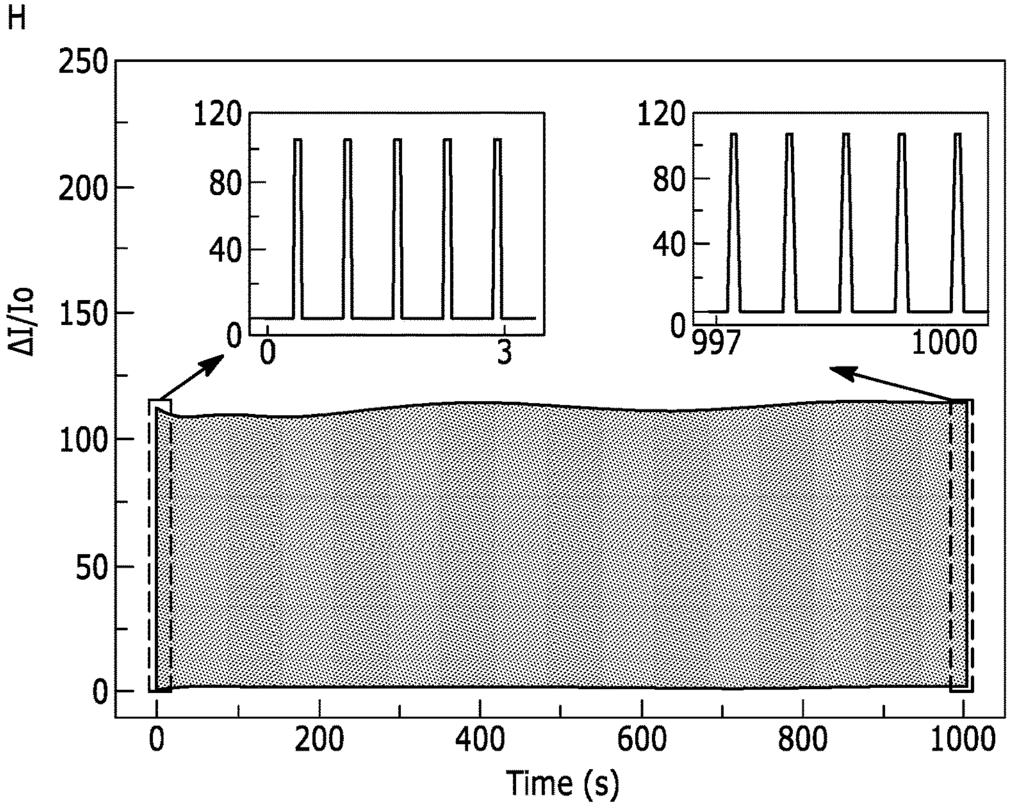

To facilitate the characterization of the performance of the piezoresistive sensor, we define the sensitivity (S) as S $(\Delta I/I_0)/\Delta P$, where ΔI is the current change before and after applying pressure, $I_0$ is the initial current without pressure applied, and ΔP represents the applied pressure change. FIG. 4D shows the relative current change ($\Delta I/I_0$) as the applied pressure increases from 0 to 35 kPa. It is found that the curve can be divided into two segments with different slopes, corresponding to two different sensitivities. In the low-pressure region (0-11 kPa), the sensitivity of the sensor is 11.2/kPa while in the high-pressure region (13.5-33.5 kPa), the sensitivity is around 3.1/kPa. FIG. 4E shows the real-time measurement of the relative current change under cyclic loadings with different pressure magnitudes. All the measured current changes are varying with the applied pressures repeatedly, demonstrating its robustness and reliability. The measured response time for the tactile sensor is ~40 ms while the measured recovery time in sensing is ~20 ms (FIG. 4F). The sensitivity of the tactile sensor is excellent, and it can detect the small changes induced by loading-unloading a plant leaf (70 mg) and a seed (180 mg) (FIG. 4G). Moreover, the piezoresistive sensor exhibits excellent reproducibility and durability (FIG. 4H). It is demonstrated that for more than 1500 cycles of repeated loading-unloading of a pressure of 10 kPa, there is no obvious change of the relative current signals.

Figure 5A:
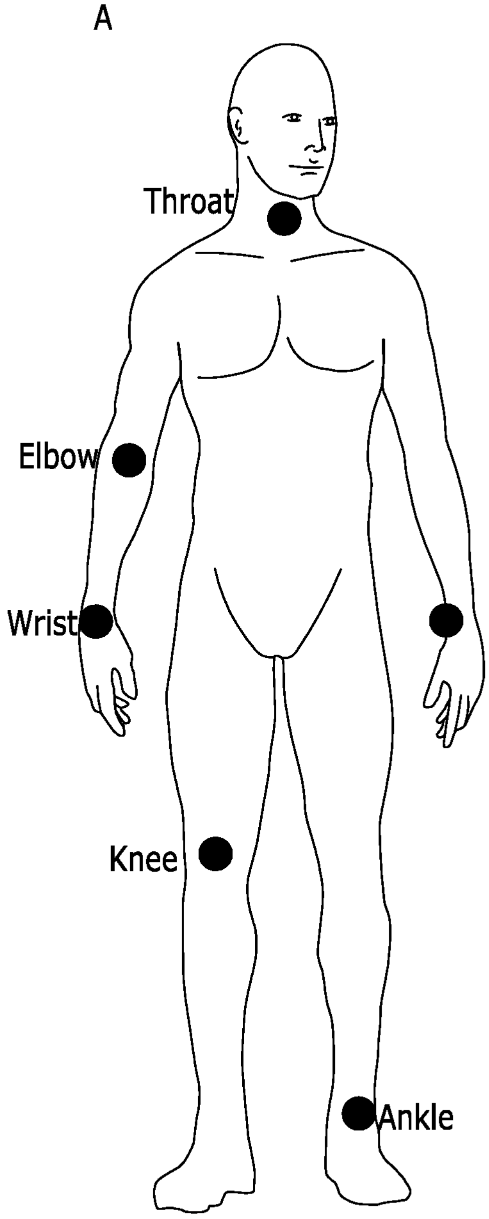
FIGS. 5(A-I) illustrate real-time monitoring of physiological signals and body motions using the textile-based tactile sensor. (A) Schematic illustration of a human body with the possible monitoring positions marked by blue color. (B) Real-time current signal measured by the tactile sensor when a volunteer wears the sensor in throat region and speaks “Nice to meet you, it’s a beautiful day”. Different words can be recorded and distinguished based on the unique signal patterns of pronunciation. (C) Real-time current signal responding to the words “hello” five times. It demonstrates excellent repeatability in voice recognition. (D) Photograph of the sensor device bonded on the wrist surface for detecting artery pulse pressure. (E) Real-time current signal responding to the artery pulse pressure. Each pulse waveform can clearly show the typical P-wave, T-wave, and D-wave. (F-H) Real-time current signals measured by the tactile sensors for the bending-releasing movement of (F) elbow, (G) wrist, (H) knee under different bending angles. (I) Real-time current signal measured by the tactile sensor attached on the ankle to detect human movement states: running and walking.
Figure 5B:
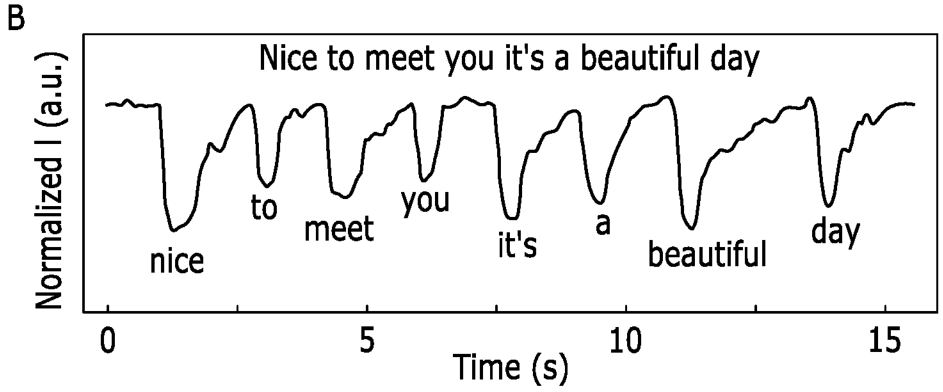
Figure 5C:
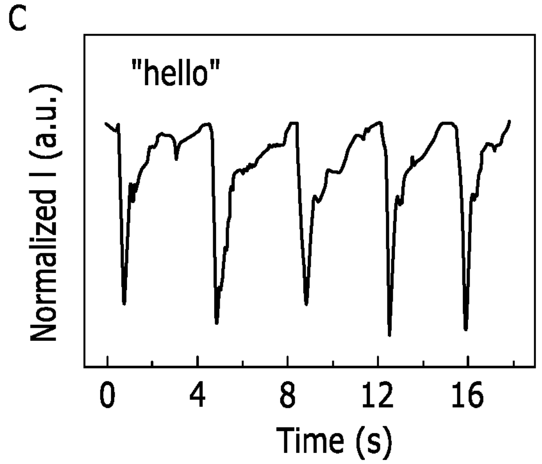

Additionally, we demonstrate the tactile sensor can be used for monitoring various physiological signals and joint motions of wearers in a real-time manner when it is deployed at different body parts (FIG. 5A). For example, when the textile-based sensor is attached to the throat region of a volunteer, it can accurately sense the muscle movement at the throat region when speaking and thereby recognize the voice pat-terns (FIGS. 5B, C, and 11). As shown in FIG. 5B, the sensor can recognize the different words spoken by the person in a sentence through the unique signal patterns detected through the different epidermis movements induced by laryngeal prominence. Furthermore, the sensor demonstrates good repeatability in recognizing the specific words in speaking (FIG. 5C). For example, when the volunteers say the same word "hello" repeatedly five times, it obtains nearly identical signal patterns of voice signals. Therefore, this sensor has the potential to be used for natural language-based human-machine interfaces and phonation rehabilitation exercises.

Figure 5D:
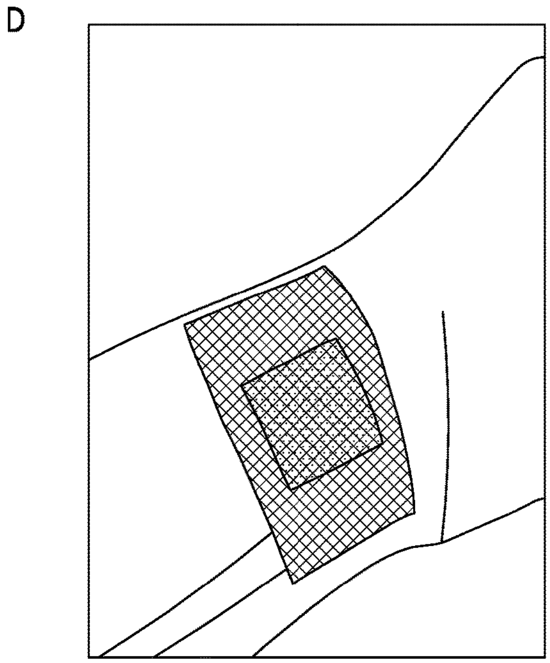
Figure 5E:
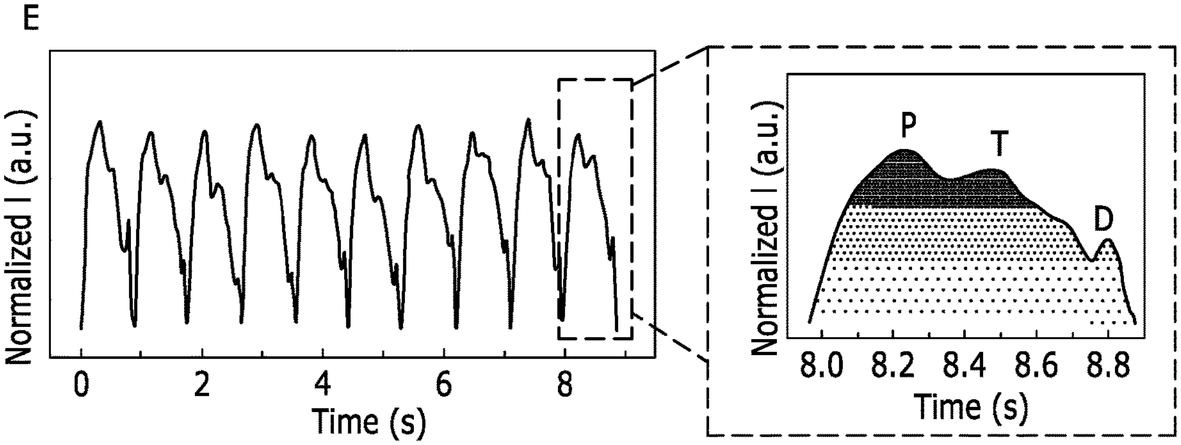

In personalized healthcare, vital physiological signals such as heart or pulse rate are valuable information for evaluating the medical conditions of patients with cardiovascular disease. As a demonstration, we attach the textile sensor onto the wrist surface of a volunteer to monitor the pulse rate and pulse waveform in a real-time manner (FIG. 5D). FIG. 3E shows the pulse signals recorded for a period of 9 s, indicating a recorded pulse rate of ~68 beats/min, within the normal range of a healthy adult. Furthermore, from the recorded regular and repeated signal patterns, the sensor is able to distinguish the three characteristic peaks of a standard pulse waveform, i.e., "P" (percussion wave), "T" (tidal wave), and "D" (diastolic wave), indicating the great potential of such sensors in biomedical applications.

Figure 5F:
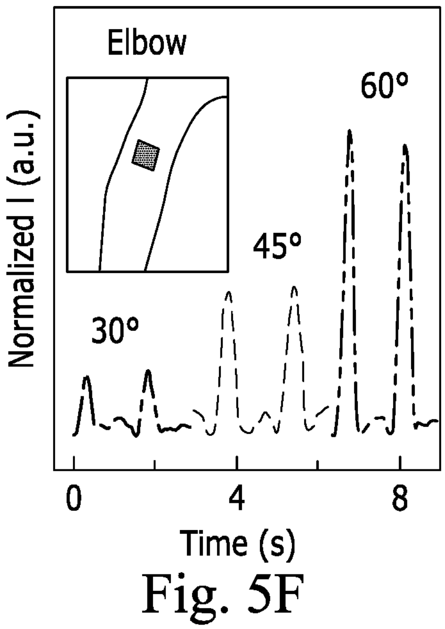
Figure 5G:
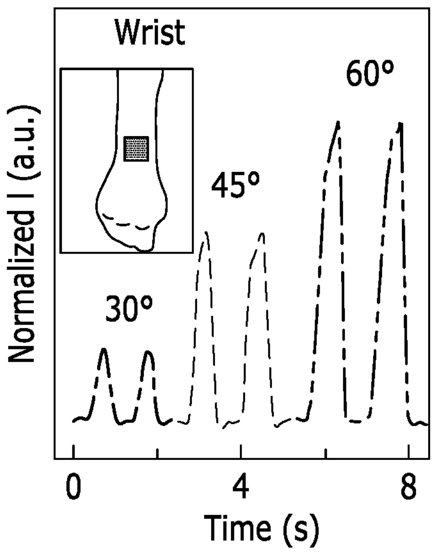
Figure 5H:
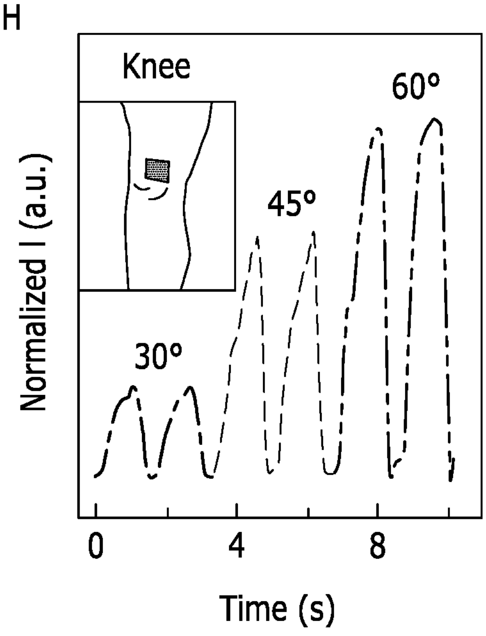
Figure 5I:
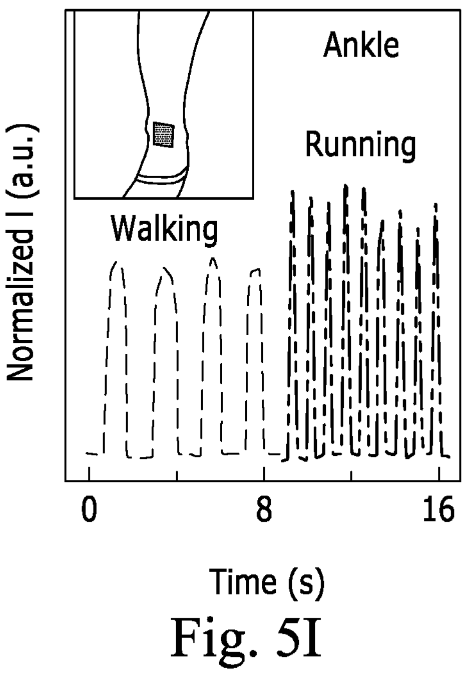

We further demonstrate the textile sensor worked as a motion detector to record the current response under the bending-releasing cycles when mounted at the joints of the human body, such as elbow, wrist, knee, and ankle (FIG. 5A). If the piezoresistive sensor is directly attached on the elbow, the sensor is compressed as the elbow bends, causing an increase of conductive pathway and thereby a decrease of the conducting resistance and an increase of the current. When the bending angle decreases, the current signal becomes smaller (FIG. 5F). Similarly, the sensor is capable of accurately detecting the bending motions of the wrist and knee (FIGS. 5G and H). Furthermore, we find that the sensor attached to the ankle joint can detect and discriminate human movement states. When the person is walking or running, the amplitude and frequency of human motion are quite different, which can be reflected through the induced current change in the sensor at different motion states (FIG. 5I). These results indicate that our sensor can be readily utilized for detecting kinematic signals and joint motions and should promising applications in the fields of personalized health monitoring, human-machine interface, athletic performance monitoring, and patient rehabilitation.

Characterization of the Triboelectric Sensing Layer

Figure 6A:
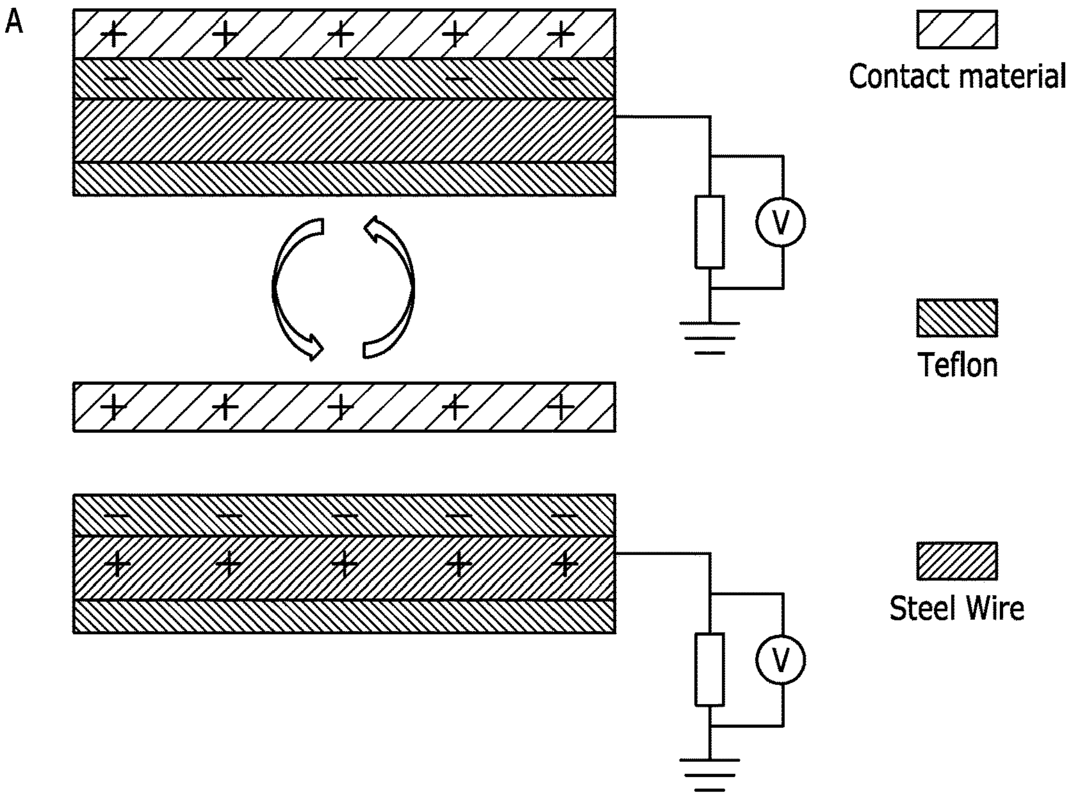
FIGS. 6(A-J) illustrate a characterization and demonstration of the triboelectric sensing layer in tactile sensor for texture perception and material discrimination. (A) Working principle of the triboelectric sensor layer. (B) Variations of the output voltage of the triboelectric sensor as a function of loading force. (C) Output voltages of the triboelectric sensor under different frequencies (0.25-2 Hz). (D) Schematic illustration of the texture perception through a sliding touch by the tactile sensor. The triboelectric sensor is attached to a semicylindrical stage and scanned over a surface with parallel line patterns. The bottom is the photographs of the micropatterned surfaces fabricated by a laser cutter (scale bar: 500 μm). (E) The voltage signals obtained by the triboelectric sensor when it is scanned over different micropatterns. (F) Fast Fourier transform (FFT) spectra of time-dependent voltage signals in (E), showing the spatial frequency of the micropatterns. (G) Schematic diagram of the artificial neural network (ANN) used for material identification. The ANN consists of an input layer, 3 hidden layers, and an output layer where all the neurons between each layer are fully connected to each other. (H) The material list with real material images and its corresponding time-domain signal for training. (I) The confusion map for classifying the materials from M1~M9. (J) The confusion map for classifying the materials in predicting materials from M1~M9.
Figure 6B:
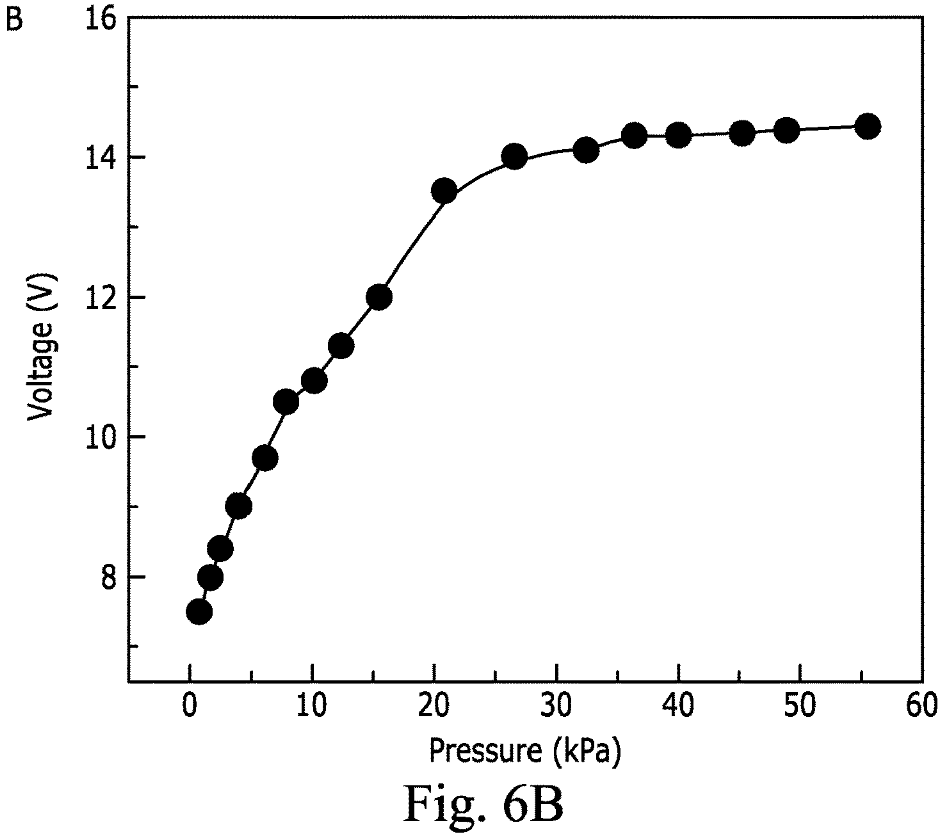
Figure 6C:
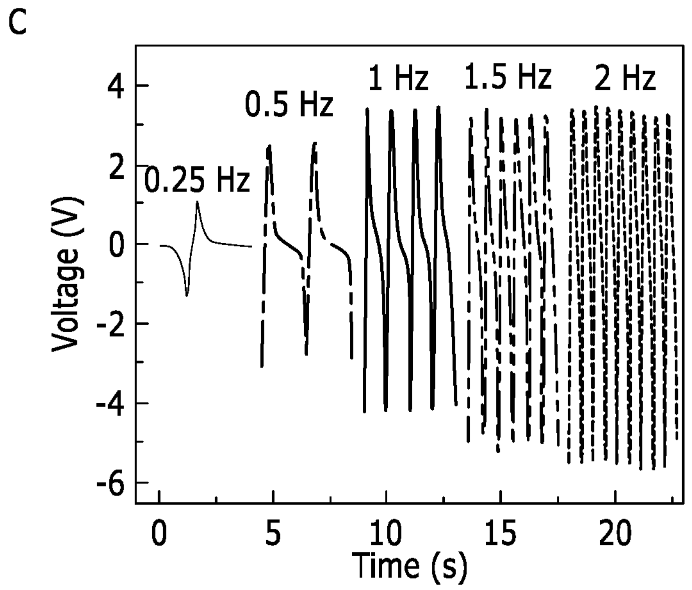
Figure 12:
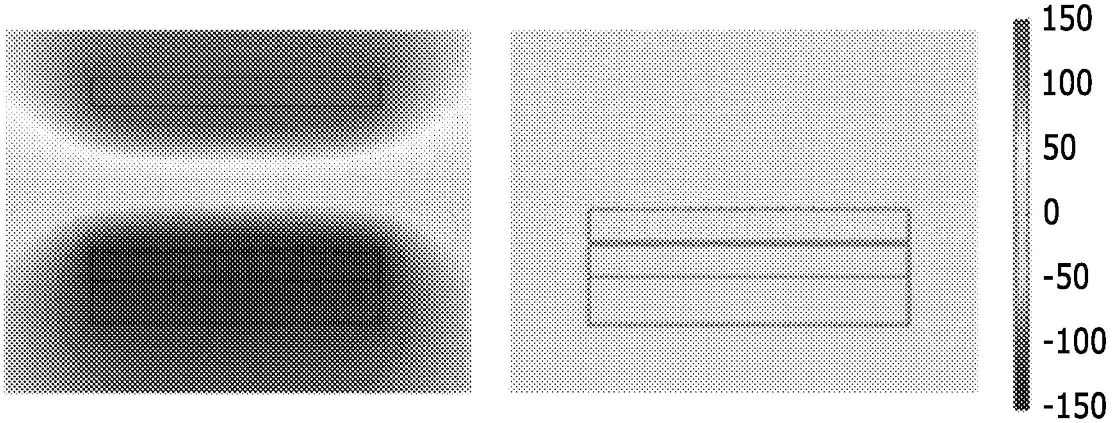
FIG. 12 illustrates numerical simulation results obtained by COMSOL for the potential distribution when the object contacts and separates between the triboelectric sensing layers.

FIG. 6A illustrates the working mechanism of the triboelectric sensing layer for the tactile sensor which is essentially a single-electrode TENG based on the coupling effect of contact electrification and electrostatic induction. This design of the single-electrode mode is especially suitable for tactile sensing owing to its simple structure and design. When an active object contacts the Teflon surface, negative triboelectric charges are gained by Teflon due to its stronger electron affinities while the active object becomes positive charged (FIG. 12). Once the active object separates from the Teflon surface, the potential difference between the two triboelectric layers will gradually increase, resulting in an instantaneous electron flow from the Cu electrode to the ground and generating an output voltage to the external load. When the two kinds of materials approach each other again, the electrons will flow back from the ground to the Cu electrode with a reversed output signal appearing. To test its sensing performance, we use an Ecoflex film (15×15 $mm^2$) as the contact material and a linear motor to provide repetitive contact-separation motions. FIG. 6*b* presents the output voltages of the TENG with pressures varying from 0 to 56 kPa. It is obvious that the output voltages have a nearly linear relationship with the applied pressure that is not larger than 22 kPa. The output voltage also depends on the touching frequency, and an increased frequency leads to a higher voltage, consistent with our previous studies (FIG. 6C).

Figure 13:
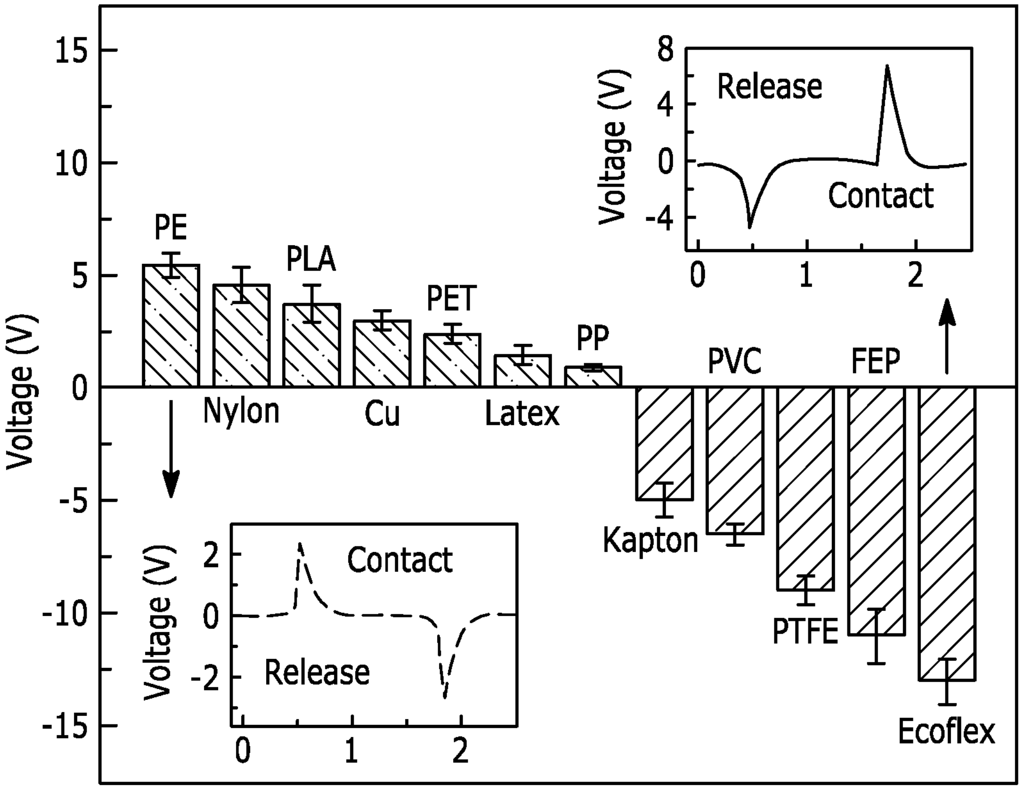
FIG. 13 illustrates comparison of the peak-to-peak voltage of the triboelectric sensors in a relative contact-separation motion for different materials. Insets are the voltage signals measured by the triboelectric sensor in a contact-separation mode using Ecoflex (top) and PE (bottom).

In addition, the unique working mechanism of the TENG-based sensor enables it to be able to sense different kinds of materials based on their inherent ability to lose/gain electrons. After the possible materials' properties are gathered, the proposed design and method can be extended for use in sorting more different materials. As shown in FIG. 13, twelve kinds of materials are screened for demonstration in our experiments. The amplitude and polarity of the output voltage by the TENG sensing layer change with the different contacting materials. The insets in FIG. 13 illustrate the voltage signals in one cycle with the two contacting materials: polyethylene (bottom) and Ecoflex (top). Compared with Teflon used in our sensor fabrication, polyethylene (PE), Nylon, polylactic acid (PLA), Cu, polyethylene terephthalate (PET), natural latex, and polypropylene (PP) are tending to lose electrons when they are in contact with Teflon, resulting in a positive voltage signal. On the contrary, Kapton, polyvinyl chloride (PVC), polytetrafluoroethylene (PTFE), and fluorinated ethylene propylene (FEP) exhibit a stronger ability to gain electrons, resulting in a negative voltage signal. Through the comparison of the amplitude and polarity of the output voltage, we can use the tactile senor to identify the type of the contact materials, which may be useful for automatic object sorting and separation in recycling and fabrication processes.

Figure 6D:
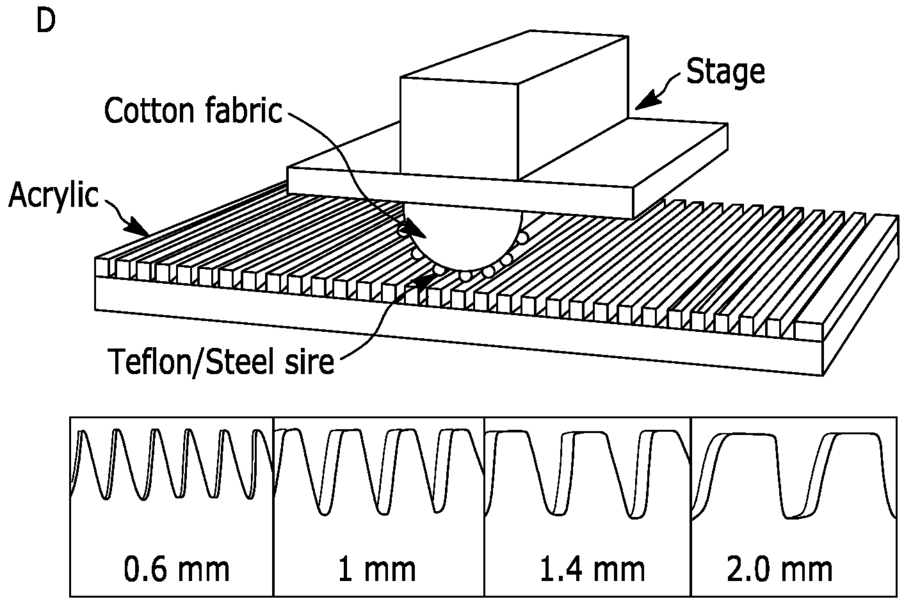
Figure 6E:
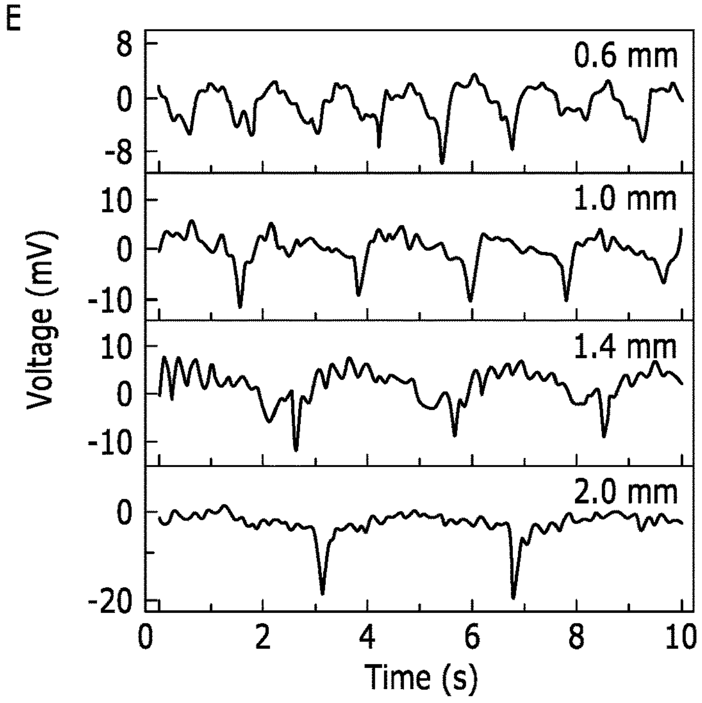

The TENG-based sensing layer can also recognize the surface morphology or texture. In our design, the fabricated sensor is attached onto a semicylindrical micro stage and then scans over the sample surfaces that have parallel line textures (FIG. 6D). Different from the contact-separation working mode shown in FIG. 6A, for the surface morphology and texture recognition the TENG sensor works in a single-electrode-based sliding mode (FIG. 14). As the sensor slides on the sample surface at the velocity of 0.5 mm $s^{-1}$, the fingerprint-like steel/Teflon fiber contacts and separates with the ridges of the micropatterns, resulting in the corresponding variations of the voltage signals (FIG. 6E).

Figure 6F:
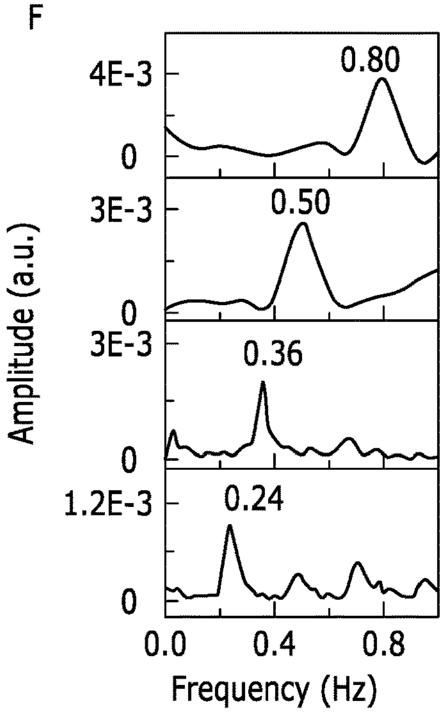

The observed voltage signals decrease with the increasing wavelength of the periodic patterns at the same scanning speed. The voltage signals in the frequency domain obtained by Fast Fourier transform (FFT) can give the characteristic frequencies that agree with the spatial frequencies of the micropatterns (FIG. 6F). For a defined texture pattern, the number of voltage signals and the corresponding characteristic frequencies in-crease with the scanning speeds (0.3-1 mm $s^{-1}$) (FIG. 15).

Figure 6G:
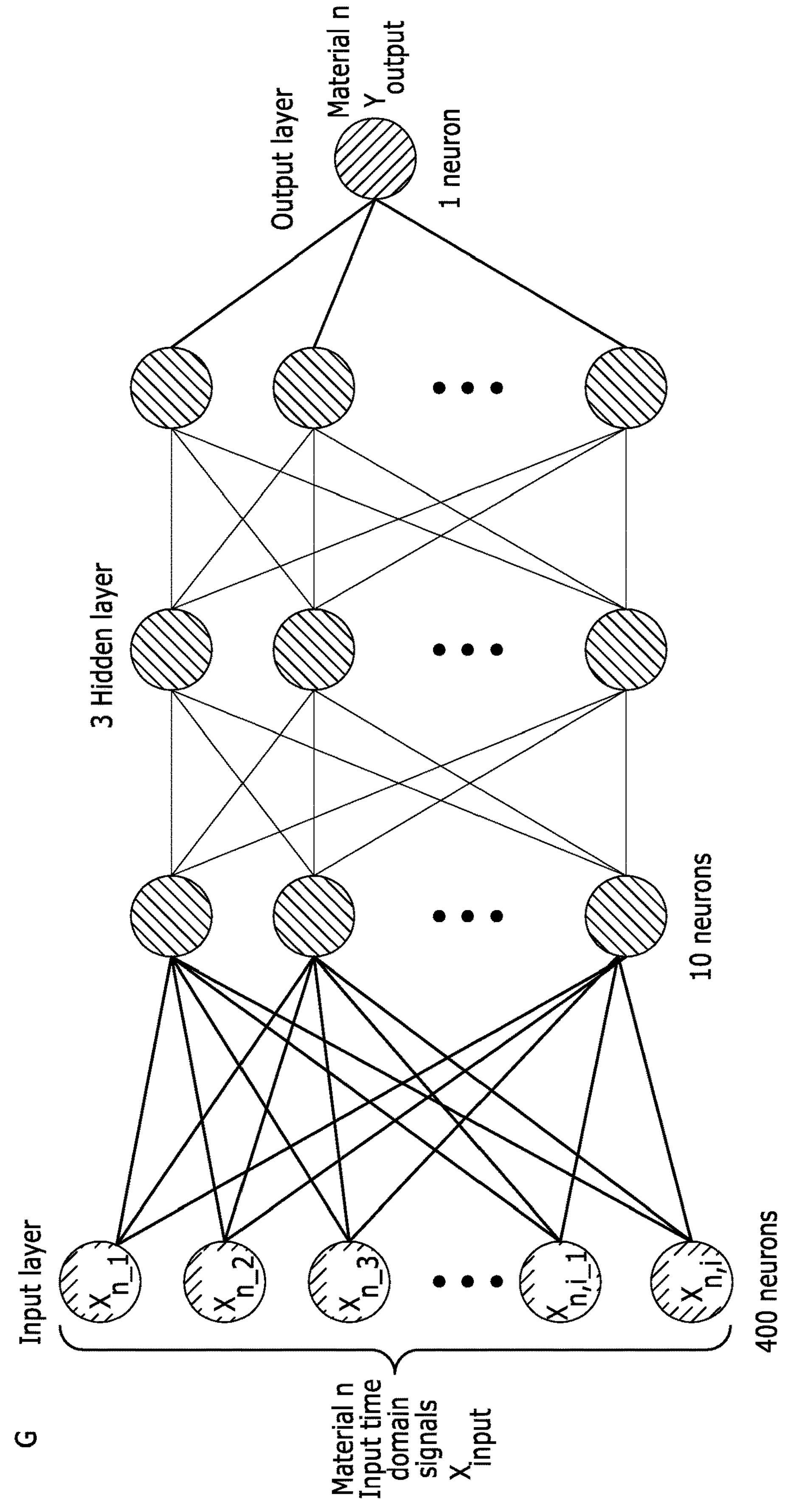
Figure 6H:
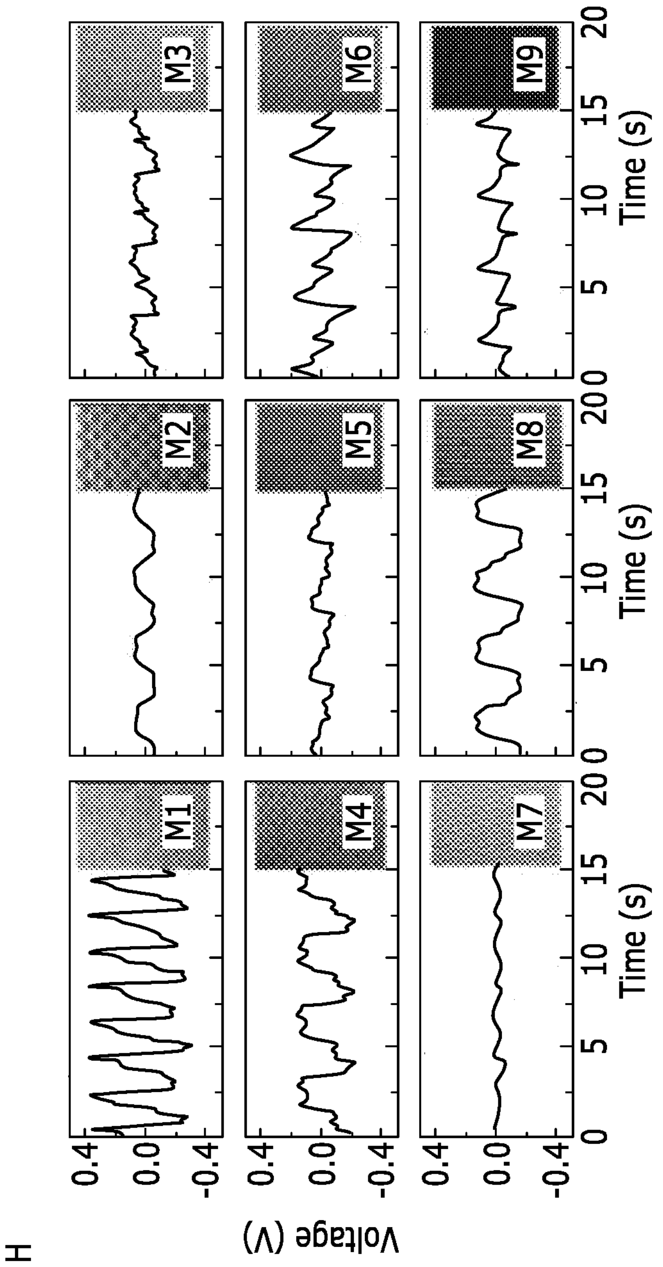
Figure 6I:
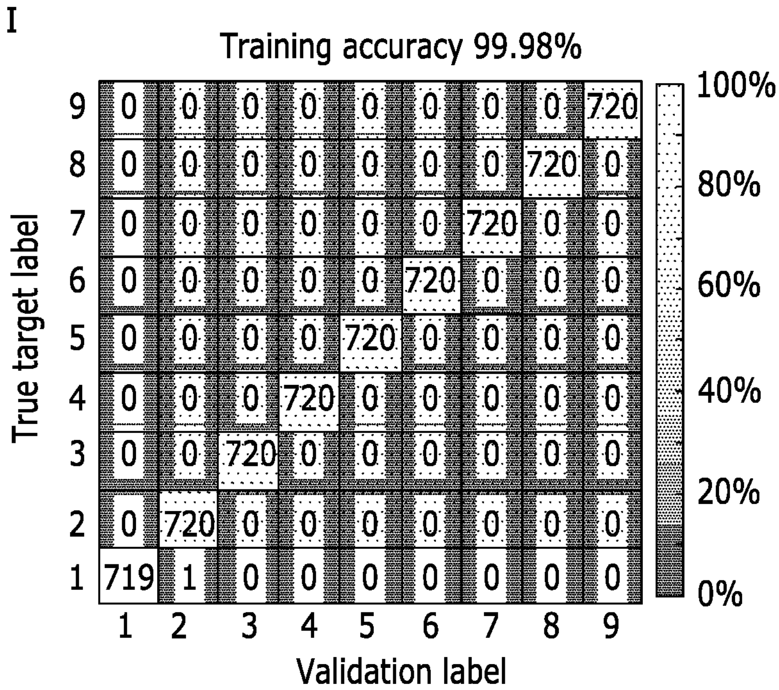
Figure 6J:
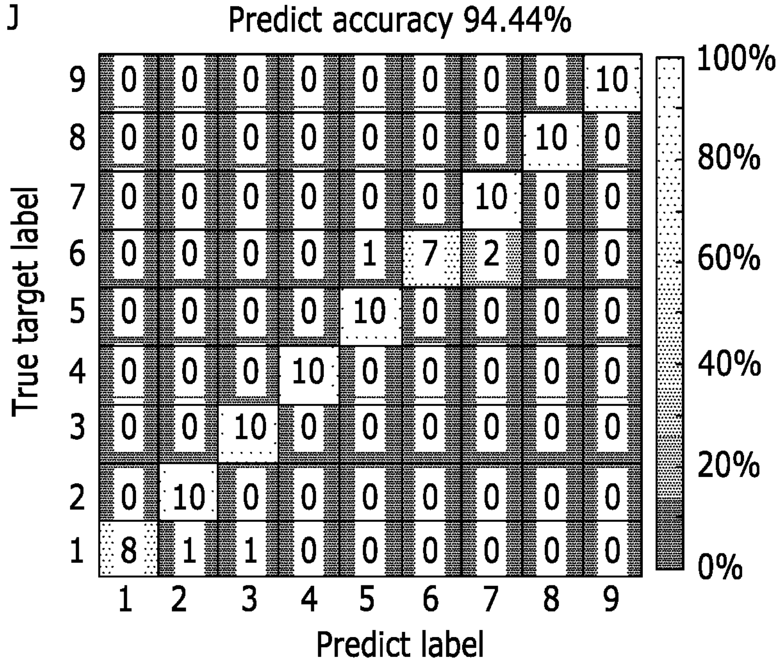

For possible large-scale applications of dense sensor arrays, it is impossible to get identical devices and sensing data with the same quality in practical fabrications and operations, especially for low-resolution soft electronics. Therefore, we propose a machine learning (ML) based framework to analyze and classify the voltage signals obtained from the TENG sensors, aiming to achieve robust sensing capability in material recognition and surface texture detection. We select the artificial neural network (ANN) method to build the model, which consists of an input layer, three hidden layers, and an output layer (FIG. 6G). We use the LM training function and the nine different materials with different textures as the training data to minimize the ANN's MSE by adjusting the connection weights and bias (FIG. 6H). Performance and generalization of the ANNs are further tested using independent testing data for cross-validation. As shown in FIG. 6I, the training accuracy can reach up to 99.98%. FIG. 6J presents the confusion map of the machine learning outcome in predicting the materials from M1-M9, where the prediction accuracy is about 94.44%.

Demonstration and Evaluation of the Textile-Based Tactile Sensor

Human skin can sense the material hardness in touching the objects. However, it is generally difficult for robotics to achieve that task using one single sensor. Here, we further demonstrate our tactile sensor for sensing the relative hardness of objects through a simple operation mechanism (FIG. 7A). The latex balloons inflated by different air pressures are used to represent the relative hardness of the touching objects. When the tactile sensor contacts or separates with the touching objects (balloons), the TENG sensing layer generates instantaneous negative and positive voltage signals due to the contact electrification, respectively (FIG. 7B, top). In comparison, the pressing and releasing motions are detected by the recorded signals from the piezoresistive sensing layer (FIG. 7B, bottom). The up-hill side and down-hill side of a current curve represented the pressing and releasing state, and the current value increases with the hardness of the object (balloon) because a larger hardness results in a large pressure applied to the sensor. Such a sensing capability enables the use of the new tactile sensors in advanced manipulations such as fruit picking to avoid potential physical damage.

We finally demonstrate the tactile sensors as an effective human-machine interface to control a soft robotic manipulator. As shown in FIG. 7C, the whole system consists of a soft robotic gripper, a soft arm, a signal processing and transmitting module, and a tactile sensor. The control signals performed by the human (e.g., wrist bending and sensor pressing) are first processed and sent to the analog ports of the Arduino board in the circuit. Then, the analog-to-digital converter (ADC) converts the analog signals into digital values and transmitted them to a control board. After that, the received signals will be compared with the pre-defined thresholds to determine whether and how to activate the DC motors to actuate the soft manipulator. FIGS. 7D and E illustrate the real-time signals recorded in the manipulation and the corresponding motion states of the soft robotic manipulator. In the original state (I), the tactile sensor is attached on the wrist and the soft arm is vertically standing on a table. When the human wrist bends (II), a continuous current signal output is detected due to the flexion of the wrist, and thereby the soft arm bends to the right side with a small bending angle. In state III, the wrist ends to a larger angle, the current signal increases further, leading to a larger bending angle of the soft robotic arm. When the tactile sensor is pressed slightly using a finger (IV), the induced voltage signal in the TENG sensing layer actuates the grasping operation of the soft gripper. When pressing the sensor again, the soft gripper can open its fingers to its initial releasing state (V). It is expected that our textile tactile sensor can be used as a useful human-machine interface for controlling soft robots to complete more complex tasks in the future.

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

Having described the invention, the following is claimed:

1. A textile-based sensor comprising:

a textile triboelectric nanogenerator sensor attached to and overlying a textile piezoresistive sensor, wherein the textile triboelectric nanogenerator sensor is configured to generate an electrical signal indicative of object contact force and/or frequency with the textile triboelectric nanogenerator sensor, object material, and object surface morphology or texture, and the textile piezoresistive sensor is configured to generate an electric signal indicative of the applied external pressure to the sensor, wherein the textile triboelectric nanogenerator sensor overlies the textile piezoresistive sensing.

2. The textile-based sensor of claim 1, comprising a textile electrode layer, a textile piezoresistive sensing layer, a textile adhesive layer, and a textile triboelectric layer.

3. The textile-based sensor of claim 2, wherein the textile piezoresistive sensing layer contacts and overlies the textile electrode layer, the textile adhesive layer contacts and overlies the piezoresistive sensing layer, and the textile triboelectric layer contacts and overlies the textile adhesive layer.

4. The textile-based sensor of claim 3, wherein the piezoresistive sensing layer and the overlying textile layer are porous, and each has a surface roughness that defines a contact area that changes as applied external pressure to the sensor changes, generating an electric signal indicative of the applied external pressure.

5. The textile-based sensor of claim 4, wherein the electric signal is a change in current under an applied voltage, the change in current indicative of the applied external pressure.

6. The textile-based sensor of any of claim 5, wherein the textile electrode layer includes a metal-coated textile.

7. The textile-based sensor of claim 6, wherein the metal-coated textile includes at least two interdigitated copper electrodes coated on a fabric substrate.

8. The textile-based sensor of claim 7, wherein the piezoresistance sensing layer includes a carbon nanotube (CNT) coated fabric.

9. The textile-based sensor of claim 8, wherein the triboelectric layer includes a single triboelectric electrode yarn arranged on a textile fabric in a pattern.

10. The textile-based sensor of claim 9, wherein the pattern is a fingerprint-like pattern.

11. The textile-based sensor of claim 10, wherein the single triboelectric electrode yarn includes an inner conductive core and an outer dielectric shell and the single triboelectric electrode yarn is stitched in the textile fabric in the pattern.

12. The textile-based sensor of claim 11, wherein triboelectric layer is configured to generate an electrical signal upon contact of the triboelectric electrode yarn with an object.

13. The textile-based sensor of claim 11, wherein object contact with the surface of the outer dielectric shell of the triboelectric electrode yarn results in a gain of negative triboelectric charges by the dielectric shell and separation of the object from the surface of the outer dielectric shell of the triboelectric electrode yarn results in electron flow from the electrode layer generating an output voltage that is dependent on and indicative of the object contact force and/or frequency with the triboelectric layer, object material, and object surface morphology or texture.

14. The textile-based sensor of claim 13, wherein the inner conductive core includes a metal and the outer dielectric shell can includes a Teflon shell.

15. A system comprising the textile-based tactile sensor of claim 1, a processor and a non-transitory computer readable medium storing machine-readable instructions executable by a processor.

16. The system of claim 15, wherein the processor is configured to execute the instruction including a machine learning model that is configured to generate an output indicative texture perception and/or material recognition based on the electric signals generated by the triboelectric nanogenerator sensing layer and the piezoresistive sensing layer.

17. The system of claim 16, wherein the machine learning model includes an artificial neural network (ANN) that comprises an input layer, output layer and at least one hidden layer configured for function approximation and nonlinear regression.

18. The system of claim 17, wherein all the neurons between every layer are fully connected by each other and the input time-domain signals of each material have i=400 neurons, where n∈[1, 2, . . . , N] and N is the types of materials that have been used to training the network and output layer are their list number of materials types from 1 to N.

19. The system of claim 18, wherein the input time-domain data of N types of materials are reorganized to N types of a matrix, each input vector and output layer has 400 neurons and 1 neuron, respectively.

20. The system of claim 19, wherein the training input signal for n-th type of material is expressed as Mn=(Mn,1, Mn,2, . . . , Mn,720) (n=1, 2, . . . , N), the total input training signal is expressed as Xdatabase=(M1, M2, . . . , MN), the training function is ƒ(Xinput)=Youtput, the output of a neuron (e.g., neuron j) in a hidden layer or the output layer, output j, is a weighted sum of the outputs of all the neurons in the preceding layer, processed by an activation function yj=ƒ(Σwij i xi+bj) where yj is the output of the neuron j, wij is the weight for the connection between a neuron I in the preceding layer and the neuron j, bj is the bias for neuron j, and ƒ is the activation function for calculating the output of neuron j based on the sum of the weighted inputs to the neuron and its bias.

* * * * *